(12) United States Patent
Nishikido et al.

(10) Patent No.: US 6,436,866 B1
(45) Date of Patent: Aug. 20, 2002

(54) LEWIS ACID CATALYST COMPOSITION

(75) Inventors: Joji Nishikido, Tokyo; Hitoshi Nakajima, Yokohama, both of (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/578,862

(22) Filed: May 26, 2000

(30) Foreign Application Priority Data

May 26, 1999 (JP) ............................................ 11-146670
Oct. 28, 1999 (JP) ............................................ 11-306436

(51) Int. Cl.$^7$ ................................................ B01J 31/00
(52) U.S. Cl. ...................... 502/168; 502/150; 502/155; 585/458; 585/462; 585/467
(58) Field of Search ................................ 502/150, 155, 502/168; 585/458, 462, 467

(56) References Cited

U.S. PATENT DOCUMENTS

| | | | | |
|---|---|---|---|---|
| 3,960,764 A | * | 6/1976 | Bernard et al. ............. | 502/168 |
| 4,302,622 A | * | 11/1981 | Chu ........................... | 585/467 |
| 4,374,294 A | * | 2/1983 | Chu ........................... | 585/467 |
| 4,395,372 A | * | 7/1983 | Kluttz et al. ................ | 585/467 |
| 4,721,559 A | * | 1/1988 | Olah ........................... | 502/168 |
| 5,110,778 A | * | 5/1992 | Olah ........................... | 502/168 |
| 5,463,082 A | | 10/1995 | Horvath et al. | |
| 6,184,168 B1 | * | 2/2001 | Lynch ........................ | 502/168 |

FOREIGN PATENT DOCUMENTS

JP  11246564 A  9/1999

OTHER PUBLICATIONS

Oxford Dictionary of Chemistry, New Edition, 3rd ed., 1996, Oxford University Press, pp. 470–471.*

* cited by examiner

*Primary Examiner*—Mark L. Bell
*Assistant Examiner*—J. Pasterczyk
(74) *Attorney, Agent, or Firm*—Birch, Stewart, Kolasch & Birch, LLP

(57) ABSTRACT

Disclosed is a Lewis acid catalyst composition comprising a specific mixed medium and a Lewis acid catalyst (II), wherein the specific mixed medium is mixed medium (I) comprising a perfluorinated aliphatic hydrocarbon (A) and at least one non-fluorinated hydrocarbon or a mixed medium (I') comprising a perfluorinated aliphatic hydrocarbon (A), a perfluorinated aromatic hydrocarbon (C) and water (D), and wherein the Lewis acid catalyst (II) is at least one compound selected from the group consisting of compounds respectively represented by the following formulae (1), (2) and (3):

$$(R_fSO_3)_nM \quad (1),$$

$$[(R_fSO_2)_2N]_nM \quad (2),$$

and $$[(R_fSO_2)_3C]_nM \quad (3).$$

Also disclosed is a Lewis acid catalyst represented by the above-mentioned formula (3).

7 Claims, 3 Drawing Sheets

LEWIS ACID CATALYST COMPOSITION

BACKGROUND OF THE INVENTION

1. Field of the Invention

The present invention relates to a Lewis acid catalyst composition which can be applied to various acid catalytic reactions. More particularly, the present invention is concerned with a Lewis acid catalyst composition comprising a specific mixed medium and a Lewis acid catalyst which is at least one compound selected from the group consisting of specific organic compounds containing a rare earth element. By the use of the Lewis acid catalyst composition of the present invention for an acid catalytic reaction, after the reaction, not only can the Lewis acid catalyst be easily separated and recovered from the catalytic reaction mixture containing the same, but also the recycling of the Lewis acid catalyst can be performed without suffering a lowering of the catalytic activity. The present invention is also concerned with a novel Lewis acid catalyst.

2. Prior Art

A Lewis acid catalyst has been employed in various acid catalytic reactions for the synthesis of organic compounds. However, the use of the Lewis acid catalyst in the catalytic reaction system has a problem in the commercial practice of the catalytic reaction because, after the reaction, the separation and recovery of the catalyst from the reaction system and the recycling of the recovered catalyst are accompanied with difficulties. For solving such a problem, a number of proposals have been made with respect to methods for separating and recovering a Lewis acid catalyst employed in a reaction. As an example of the methods, there can be mentioned a method in which a Lewis acid catalyst is fixed. For example, a study has been made about the method which comprises fixing a catalyst to an inorganic or a macromolecular carrier to thereby obtain a fixed catalyst, effecting a solid phase synthesis reaction by using the obtained fixed catalyst, and then recovering the fixed catalyst from the synthesis reaction system. However, the solid phase synthesis reaction has problems in that not only is the catalytic activity lowered, but also the solid phase synthesis reaction is not applicable to all of the organic syntheses which are generally conducted in a liquid phase.

Therefore, it has been desired to develop a technique which is advantageous not only in that a reaction efficiency in a liquid phase is increased, and a post-treatment of the reaction mixture can be done simply, but also in that the catalyst used can be easily recovered and recycled. Recently, a reaction method is disclosed in U.S. Pat. No. 5,463,082 in which a reaction solvent comprising a fluorocarbon, such as perfluoromethylcyclohexane, and a non-fluorinated hydrocarbon, such as toluene, and a catalyst, such as a group VIII metal complex containing perfluoroalkyl chains or fluorinated alkyl chains, are used. In the reaction system of this method, a reaction product and the catalyst are separately dissolved in the non-fluorinated hydrocarbon phase and the fluorocarbon phase, respectively, so that the recycling of the catalyst becomes possible. However, in the method of this prior art, it is required to use the catalyst which can be dissolved in the fluorocarbon. Therefore, the number of the catalysts which can be used in the method of the prior art is limited. Further, the reactions exemplified in this prior art are limited to oxidation by molecular oxygen and hydroformylation.

Unexamined Japanese Patent Application Laid-Open Specification No. 11-246564 discloses that a rare earth complex of a bis(perfluoroalkylsulfonyl)imide can be dissolved in a partly fluorinated hydrocarbon in the presence of a nucleophilic compound. However, this document does not disclose the recovery of the dissolved catalyst by phase separation of the solvent and the recycling of the catalyst.

Therefore, it has been desired to develop an improved reaction system which is advantageous in that a reaction efficiency in a liquid phase is increased, and not only can a reaction product be recovered easily, but also the catalyst used can be easily recovered and recycled.

SUMMARY OF THE INVENTION

In this situation, with a view toward solving the above-mentioned problems, the present inventors have conducted extensive and intensive studies about the mutual behaviors of raw materials, a Lewis acid catalyst, a reaction medium and a reaction product in a reaction system containing these substances. As a result, it has unexpectedly been found that, when a specific Lewis acid catalyst composition (containing as a Lewis acid catalyst a highly active rare earth salt of a perfluoroalkylsulfonyl compound) is used in combination with a raw material or raw materials for the intended reaction to thereby form a reaction system, not only can the catalyst exhibit high catalytic activity in a liquid phase reaction, but also the resultant reaction mixture can separate into a phase having the catalyst dissolved therein and a phase having a reaction product dissolved therein. The above-mentioned specific Lewis acid catalyst composition, in one aspect, comprises the Lewis acid catalyst and a mixed medium comprising a perfluorinated aliphatic hydrocarbon or alicyclic hydrocarbon and at least one non-fluorinated hydrocarbon selected from the group consisting of a hydrocarbon and a halogenated hydrocarbon, exclusive of a fluorinated hydrocarbon, wherein the at least one non-fluorinated hydrocarbon is generally known as a solvent capable of dissolving therein not only a raw material or raw materials conventionally used for an acid catalytic reaction but also a reaction product. In another aspect, the Lewis acid catalyst composition comprises the Lewis acid catalyst and a mixed medium comprising a perfluorinated aliphatic hydrocarbon or alicyclic hydrocarbon, a perfluorinated aromatic hydrocarbon and water. The present invention has been completed, based on the above novel finding.

On the other hand, in the course of the above-mentioned study, the present inventors have also found a novel rare earth salt of a perfluoroalkylsulfonyl compound which is stable to water and has high catalytic activity as compared to the conventional Lewis acid catalysts.

Accordingly, it is an object of the present invention to provide a Lewis acid catalyst composition which, when used for effecting a reaction in the presence of a raw material or raw materials, enables a catalyst and a reaction product to be easily separated and recovered from the resultant reaction mixture, so that the recycling of the catalyst becomes possible.

It is another object of the present invention to provide a Lewis acid catalyst composition capable of achieving a high reaction efficiency in a reaction in a liquid phase having a Lewis acid catalyst contained therein.

It is still another object of the present invention to provide a Lewis acid catalyst composition in which water is additionally added to a mixed medium.

It is a further object of the present invention to provide a novel Lewis acid catalyst which is stable to water and has high catalytic activity as compared to the conventional Lewis acid catalysts, and which can be widely used for various acid catalytic reactions.

DESCRIPTION OF REFERENCE CHARACTERS

Figure 1:
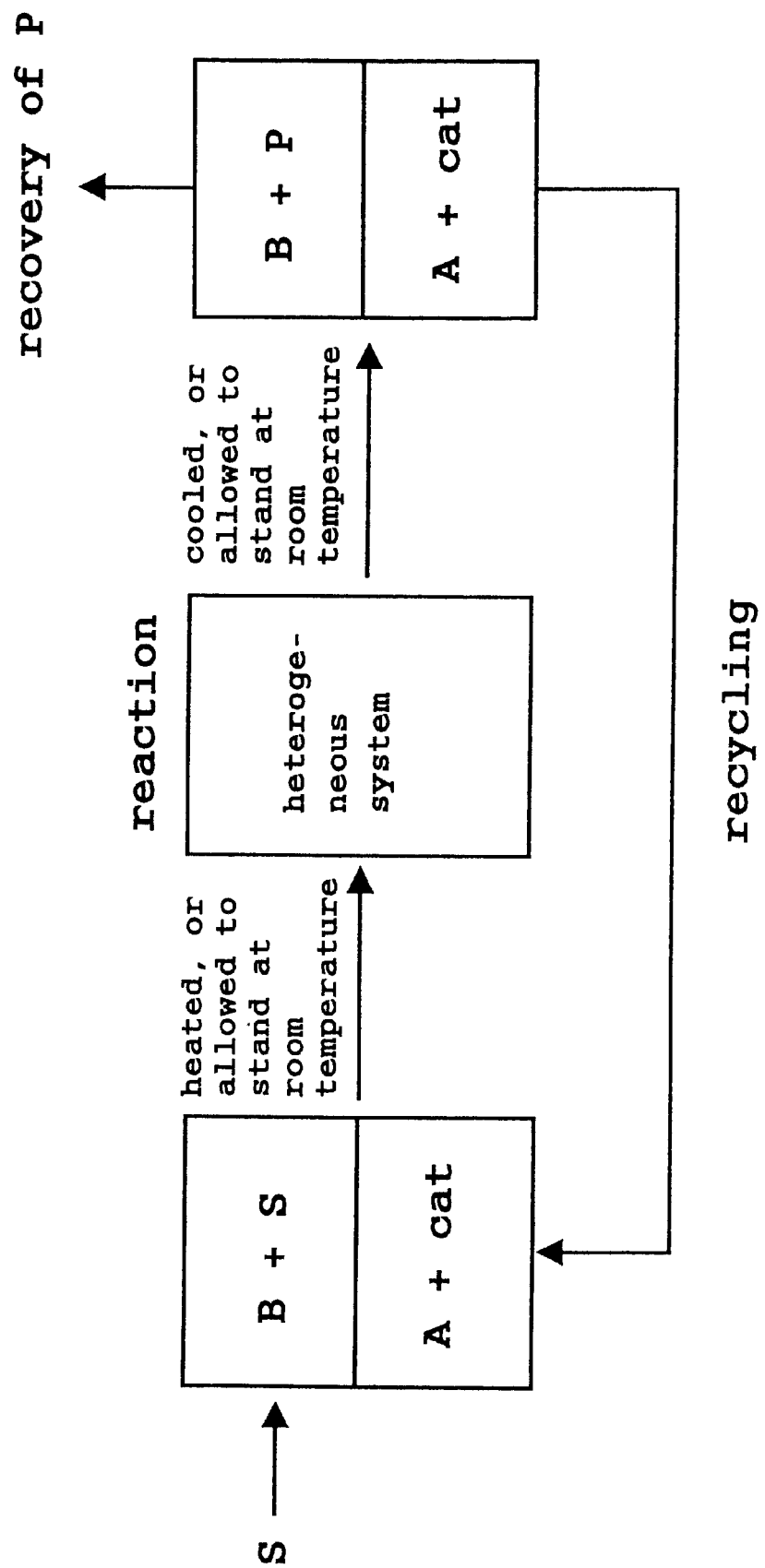
FIG. 1 is a schematic diagram showing the characteristic feature of a reaction system using a first preferred form of the Lewis acid catalyst composition of the present invention.

A: perfluorinated aliphatic hydrocarbon
B: non-fluorinated hydrocarbon
C: perfluorinated aromatic hydrocarbon
D: water
S: raw material or materials
cat: Lewis acid catalyst
P: product

DETAILED DESCRIPTION OF THE INVENTION

In one aspect of the present invention, there is provided a Lewis acid catalyst composition comprising (I) a mixed medium and (II) a Lewis acid catalyst, the mixed medium (I) comprising (A) a perfluorinated aliphatic hydrocarbon or alicyclic hydrocarbon, and (B) at least one non-fluorinated hydrocarbon selected from the group consisting of an aliphatic hydrocarbon or alicyclic hydrocarbon; a halogenated aliphatic hydrocarbon, exclusive of a fluorinated aliphatic hydrocarbon or alicyclic hydrocarbon; an aromatic hydrocarbon; and a halogenated aromatic hydrocarbon, exclusive of a fluorinated aromatic hydrocarbon, the Lewis acid catalyst (II) being at least one compound selected from the group consisting of compounds respectively represented by the following formulae (1), (2) and (3):

$$(R_fSO_3)_nM \quad (1),$$

$$[(R_fSO_2)_2N]_nM \quad (2),$$

and $$[(R_fSO_2)_3C]_nM \quad (3)$$

wherein $R_f$ represents a perfluoroalkyl group having 2 or more carbon atoms, M represents a rare earth element, and n represents an integer equivalent to the valence of M.

In another aspect of the present invention, there is provided a Lewis acid catalyst composition comprising (I') a mixed medium and (II) a Lewis acid catalyst, the mixed medium (I') comprising (A) a perfluorinated aliphatic hydrocarbon or alicyclic hydrocarbon, (C) a perfluorinated aromatic hydrocarbon, and (D) water, and the Lewis acid catalyst (II) being at least one compound selected from the group consisting of compounds respectively represented by the following formulae (1), (2) and (3):

$$(R_fSO_3)_nM \quad (1),$$

$$[(R_fSO_2)_2N]_nM \quad (2),$$

and $$[(R_fSO_2)_3C]_nM \quad (3)$$

wherein $R_f$ represents a perfluoroalkyl group having 2 or more carbon atoms, M represents a rare earth element, and n represents an integer equivalent to the valence of M.

For an easy understanding of the present invention, the essential features and various preferred embodiments of the present invention are enumerated below.

1. A Lewis acid catalyst composition comprising (I) a mixed medium and (II) a Lewis acid catalyst, the mixed medium (I) comprising (A) a perfluorinated aliphatic hydrocarbon or alicyclic hydrocarbon, and (B) at least one non-fluorinated hydrocarbon selected from the group consisting of an aliphatic hydrocarbon or alicyclic hydrocarbon; a halogenated aliphatic hydrocarbon, exclusive of a fluorinated aliphatic hydrocarbon or alicyclic hydrocarbon; an aromatic hydrocarbon; and a halogenated aromatic hydrocarbon, exclusive of a fluorinated aromatic hydrocarbon, the Lewis acid catalyst (II) being at least one compound selected from the group consisting of compounds respectively represented by the following formulae (1), (2) and (3):

$$(R_fSO_3)_nM \quad (1),$$

$$[(R_fSO_2)_2N]_nM \quad (2),$$

and $$[(R_fSO_2)_3C]_nM \quad (3)$$

wherein $R_f$ represents a perfluoroalkyl group having 2 or more carbon atoms, M represents a rare earth element, and n represents an integer equivalent to the valence of M.

2. The Lewis acid catalyst composition according to item 1 above, wherein the mixed medium (I) further comprises (C) a perfluorinated aromatic hydrocarbon.

3. The Lewis acid catalyst composition according to item 2 above, wherein the ratio of the total volume of the perfluorinated aliphatic hydrocarbon or alicyclic hydrocarbon (A) and the non-fluorinated hydrocarbon (B) to the volume of the perfluorinated aromatic hydrocarbon (C) is 1.5 or more.

4. The Lewis acid catalyst composition according to item 1 or 2 above, which further comprises (III) at least one nucleophilic reagent.

5. A Lewis acid catalyst composition comprising (I') a mixed medium and (II) a Lewis acid catalyst, the mixed medium (I') comprising (A) a perfluorinated aliphatic hydrocarbon or alicyclic hydrocarbon, (C) a perfluorinated aromatic hydrocarbon, and (D) water, and the Lewis acid catalyst (II) being at least one compound selected from the group consisting of compounds respectively represented by the following formulae (1), (2) and (3):

$$(R_fSO_3)_nM \quad (1),$$

$$[(R_fSO_2)_2N]_nM \quad (2),$$

and $$[(R_fSO_2)_3C]_nM \quad (3)$$

wherein $R_f$ represents a perfluoroalkyl group having 2 or more carbon atoms, M represents a rare earth element, and n represents an integer equivalent to the valence of M.

6. The Lewis acid composition according to item 5 above, which further comprises (III) at least one nucleophilic reagent.

7. A Lewis acid catalyst represented by the following formula (3):

$$[(R_fSO_2)_3C]_nM \quad (3)$$

wherein $R_f$ represents a perfluoroalkyl group having 2 or more carbon atoms, M represents a rare earth element, and n represents an integer equivalent to the valence of M.

Hereinbelow, the present invention will be described in more detail.

The Lewis acid catalyst composition of the present invention comprises a mixed medium (I) or (I'), and a Lewis acid catalyst (II). In the present invention, the compound used as a Lewis acid catalyst (II) is a compound selected from the group consisting of a rare earth salt of a perfluoroalkylsulfonate represented by the following formula (1), a rare earth salt of a bis(perfluoroalkylsulfonyl)imide represented by the following formula (2), and a rare earth salt of a tris(perfluoroalkylsulfonyl)methide represented by the following formula (3):

$$(R_fSO_3)_nM \quad (1),$$

$$[(R_fSO_2)_2N]_nM \quad (2),$$

and $$[(R_fSO_2)_3C]_nM \quad (3)$$

wherein $R_f$ represents a perfluoroalkyl group having 2 or more carbon atoms, M represents a rare earth element, and n represents an integer equivalent to the valence of M.

In formulae (1), (2) and (3), $R_f$ represents a perfluoroalkyl group having 2 or more carbon atoms, preferably 4 to 20 carbon atoms, more preferably 8 to 20 carbon atoms. Examples of perfluoroalkyl groups having 2 or more carbon atoms include a perfluoroethyl group, a perfluoropropyl group, a perfluorobutyl group, a perfluoropentyl group, a perfluorohexyl group, a perfluoroheptyl group, a perfluorooctyl group, a perfluorodecyl group, a perfluoroundecyl group, a perfluorododecyl group, a perfluorohexadecyl group and a perfluorooctadecyl group.

Further, in formulae (1), (2) and (3), M represents a rare earth element selected from the group consisting of lanthanum series elements, scandium and yttrium. In the present invention, the above-mentioned compounds (1), (2) and (3) can be used individually or in combination.

With respect to the rare earth salt of a perfluoroalkylsulfonate represented by formula (1), reference can be made to *Bull. Chem. Soc. Jpn.* 70, 1421–1426 (1997) and the like. With respect to the rare earth salt of a bis(perfluoroalkylsulfonyl)imide represented by formula (2), reference can be made to *Chemistry Letters*, 307–308 (1995), Japan, and the like. The rare earth salt of a tris(perfluoroalkylsulfonyl)methide represented by formula (3) is a novel compound which has been found by the present inventors, and can be produced in accordance with the method described below.

The Lewis acid catalyst (II) contained in the Lewis acid catalyst composition of the present invention is stable to water and has high catalytic activity, as compared to other known Lewis acid catalysts, such as aluminum chloride, titanium tetrachloride and boron trifluoride. In the present invention, the compound represented by formula (2) or (3) is preferred from the viewpoint of reactivity.

Next, an explanation is made with respect to the mixed medium (I) used in the present invention.

In a first form of the Lewis acid catalyst composition of the present invention, as a mixed medium (I), both a perfluorinated aliphatic hydrocarbon or alicyclic hydrocarbon (A) and at least one non-fluorinated hydrocarbon (B) are used, wherein the non-fluorinated hydrocarbon (B) is selected from the group consisting of an aliphatic hydrocarbon or alicyclic hydrocarbon; a halogenated aliphatic hydrocarbon, exclusive of a fluorinated aliphatic hydrocarbon or alicyclic hydrocarbon; an aromatic hydrocarbon; and a halogenated aromatic hydrocarbon, exclusive of a fluorinated aromatic hydrocarbon.

The Lewis acid catalyst used in the present invention is a specific, polar segment-containing metal complex. Therefore, the Lewis acid catalyst of the present invention cannot be dissolved in the perfluorinated aliphatic hydrocarbon or alicyclic hydrocarbon (A) used alone as shown in Reference Example 1. Further, the Lewis acid catalyst cannot also be dissolved in medium (A) used alone even in the presence of a nucleophilic reagent as shown in Reference Example 2. However, as shown in Reference Examples 3 and 4, when the non-fluorinated hydrocarbon (B) and at least one nucleophilic reagent (III) are present together with the perfluorinated aliphatic hydrocarbon or alicyclic hydrocarbon (A), the Lewis acid catalyst can be dissolved in medium (A). When an acid catalytic reaction is conducted using such a Lewis acid catalyst composition, the same level of reactivity as achieved in the conventional liquid phase reactions can be achieved because the Lewis acid catalyst is dissolved in the mixed medium. Further, when an acid catalytic reaction is performed using the Lewis acid catalyst composition of the present invention, by only allowing the resultant reaction mixture to stand still at room temperature after the reaction, the Lewis acid catalyst and a product are separately dissolved in different phases, that is, the catalyst is dissolved in a lower phase of the perfluorinated aliphatic hydrocarbon or alicyclic hydrocarbon (A) and the product is dissolved in an upper phase of the non-fluorinated hydrocarbon (B), so that the separation, recovery and recycling of the catalyst can be performed easily.

With respect to the perfluorinated aliphatic hydrocarbon or alicyclic hydrocarbon (A), there is no particular limitation as long as the perfluorinated aliphatic hydrocarbon or alicyclic hydrocarbon is in a liquid form at room temperature. However, $C_6$–$C_{10}$ perfluorinated aliphatic hydrocarbon or alicyclic hydrocarbons, which may have a linear, a branched or a cyclic configuration, are generally preferred. Examples of such perfluorinated aliphatic hydrocarbon or alicyclic hydrocarbons include perfluorohexane, perfluoroheptane, perfluorooctane, perfluorononane, perfluorocyclopentane, perfluorocyclohexane and perfluoromethylcyclohexane. These hydrocarbons can be used individually or in combination.

With respect to the non-fluorinated hydrocarbon (B), there is no particular limitation as long as the non-fluorinated hydrocarbon is at least one compound selected from the group consisting of an aliphatic hydrocarbon or alicyclic hydrocarbon; a halogenated aliphatic hydrocarbon or alicyclic hydrocarbon, exclusive of a fluorinated aliphatic hydrocarbon or alicyclic hydrocarbon; an aromatic hydrocarbon; and a halogenated aromatic hydrocarbon, exclusive of a fluorinated aromatic hydrocarbon, and wherein the compound satisfies the requirements that it is in a liquid form at room temperature, and it can be phase-separated from the perfluorinated aliphatic hydrocarbon or alicyclic hydrocarbon (A).

With respect to the aliphatic hydrocarbon or alicyclic hydrocarbon used as a non-fluorinated hydrocarbon (B), those which have 5 to 20 carbon atoms, preferably 5 to 16 carbon atoms, can be used. Preferred are linear or branched hydrocarbons having 7 or more carbon atoms. More preferred are linear or branched hydrocarbons having 8 to 16 carbon atoms. Cyclic hydrocarbons having 5 to 16 carbon atoms are also preferred. Examples of such aliphatic hydrocarbon or alicyclic hydrocarbons include n-heptane, n-octane, n-nonane, n-decane, undecane, dodecane, hexadecane, cyclopentane, cyclohexane and methylcyclohexane.

In the halogenated aliphatic hydrocarbon used as a non-fluorinated hydrocarbon (B), there is no particular limitation with respect to the number of carbon atoms and the number of hydrogen atoms replaced by halogen atoms as long as the halogenated aliphatic hydrocarbon is in a liquid form at room temperature. However, $C_1$–$C_{10}$ halogenated aliphatic hydrocarbons are preferred. Examples of such halogenated aliphatic hydrocarbons include dichloromethane, dichloroethane and dibromoethane.

With respect to the aromatic hydrocarbon used as a non-fluorinated hydrocarbon (B), those which have 6 to 15 carbon atoms are preferred. Examples of such aromatic hydrocarbons include benzene, and benzene substituted with an alkyl group or groups, such as toluene, o-xylene, m-xylene, p-xylene, ethylbenzene, cumene and mesitylene.

In the halogenated aromatic hydrocarbon used as a non-fluorinated hydrocarbon (B), there is no particular limitation with respect to the number of hydrogen atoms replaced by halogen atoms. However, $C_6$–$C_{10}$ halogenated aromatic hydrocarbons are preferred. Examples of such halogenated aromatic hydrocarbons include chlorobenzene, dichlorobenzene, bromobenzene and chlorotoluene.

These non-fluorinated hydrocarbons can be used individually or in combination.

The volumes of the perfluorinated aliphatic hydrocarbon or alicyclic hydrocarbon (A) and the non-fluorinated hydrocarbon (B) vary depending on the types of these media used for the mixed medium. However, each of the volumes of media (A) and (B) contained in the mixed medium is, individually, preferably at least 5% by volume or more, more preferably 10% by volume or more, most preferably 30% by volume or more, based on the whole volume of the mixed medium. In the mixed medium (I), when the volume of one of the above-mentioned media is much smaller than that of the other, the phase separation of the mixed medium becomes difficult. Further, when the volume of the perfluorinated aliphatic hydrocarbon or alicyclic hydrocarbon (A) is less than 5% by volume, the solubility of the catalyst is lowered. When the volume of the non-fluorinated hydrocarbon (B) is less than 5% by volume, the solubility of a raw material (or raw materials) is lowered.

The Lewis acid catalyst composition comprising the mixed medium of the perfluorinated aliphatic hydrocarbon or alicyclic hydrocarbon (A) and the non-fluorinated hydrocarbon (B) can be employed in general organic reactions using a Lewis acid as a catalyst as described below.

When an acid catalytic reaction is performed using the first form of the Lewis acid catalyst composition of the present invention wherein the mixed medium comprises the perfluorinated aliphatic hydrocarbon or alicyclic hydrocarbon (A) and the non-fluorinated hydrocarbon (B), as shown in FIG. 1, a nucleophilic reagent or nucleophilic reagents (III) (used as a raw material or raw materials) are dissolved in the non-fluorinated hydrocarbon (B), and the catalyst is dissolved in the perfluorinated aliphatic hydrocarbon or alicyclic hydrocarbon (A). The perfluorinated aliphatic hydrocarbon or alicyclic hydrocarbon (A) and the non-fluorinated hydrocarbon (B) are not mutually soluble, thus causing a phase separation of the reaction system. That is, the reaction system is heterogeneous even when heated to about 80° C. After the reaction, by allowing the resultant reaction mixture to stand still at room temperature, the non-fluorinated hydrocarbon (B) and the perfluorinated aliphatic hydrocarbon or alicyclic hydrocarbon (A) are generally caused to form an upper phase and a lower phase, respectively. A reaction product can be recovered from the upper phase, and the Lewis acid catalyst can be recycled by recovering the lower phase because almost all of the catalyst is contained in the lower phase.

When a raw material contains water, for example in the form of an aqueous hydrogen peroxide or formalin, the first form of the Lewis acid catalyst composition of the present invention separates into three phases, that is, a phase of the perfluorinated aliphatic hydrocarbon or alicyclic hydrocarbon (A), a phase of the non-fluorinated hydrocarbon (B) and an aqueous phase. In this case, in general, the perfluorinated aliphatic hydrocarbon or alicyclic hydrocarbon (A) containing the catalyst forms a lower phase, and the non-fluorinated hydrocarbon (B) phase containing a water-insoluble raw material, the aqueous phase containing the water-soluble raw material and the lower phase together assume a three-layer configuration. The positions of the non-fluorinated hydrocarbon (B) phase and the aqueous phase vary depending on the mixed medium, the raw materials, the type of the reaction and the like. When an acid catalytic reaction is performed using such a Lewis acid catalyst composition, the resultant reaction mixture separates into a perfluorinated aliphatic hydrocarbon or alicyclic hydrocarbon (A) phase containing the catalyst, an aqueous phase and a non-fluorinated hydrocarbon (B) phase containing a water-insoluble reaction product. In the case of this system, the reaction product can be recovered from the upper or middle phase, and the Lewis acid catalyst can be recycled by recovering the lower phase because almost all of the catalyst is contained in the lower phase.

The content of water in the Lewis acid catalyst composition is preferably from 2 to 80% by volume, more preferably from 5 to 50% by volume, based on the total volume of the mixed medium and water. When the content of water is more than 80% by volume, the reaction system assumes a gel form due to the surfactant activity of the catalyst, so that the phase separation of the reaction mixture becomes difficult.

In a second form of the Lewis acid catalyst composition of the present invention, the mixed medium (I) contained in the Lewis acid catalyst composition further contains a perfluorinated aromatic hydrocarbon (C).

In the second form of the Lewis acid catalyst composition of the present invention in which the mixed medium (I) contains the perfluorinated aromatic hydrocarbon (C), the Lewis acid catalyst used in the present invention can hardly be dissolved in the perfluorinated aliphatic hydrocarbon or alicyclic hydrocarbon (A) by only mixing the catalyst with mixed medium (I) containing medium (C). However, in the presence of at least one nucleophilic reagent (III) and the mixed medium (I) containing the perfluorinated aromatic hydrocarbon (C), the solubility of the Lewis acid catalyst in the perfluorinated aliphatic hydrocarbon or alicyclic hydrocarbon (A) is remarkably increased. Further, the perfluorinated aromatic hydrocarbon (C) is soluble in both the perfluorinated aliphatic hydrocarbon or alicyclic hydrocarbon (A) and the non-fluorinated hydrocarbon (B). That is, the perfluorinated aromatic hydrocarbon (C) functions as a compatibility agent for the perfluorinated aliphatic hydrocarbon or alicyclic hydrocarbon (A) and the non-fluorinated hydrocarbon (B). Accordingly, when the mixed medium comprising media (A), (B) and (C) is heated to 36° C. or more, a homogeneous reaction system can be obtained. Therefore, when an acid catalytic reaction is performed using such a Lewis acid catalyst composition while heating, a high reaction efficiency can be achieved because the reaction proceeds in the homogeneous system. In this connection, it should be noted that, when the resultant reaction mixture is cooled to room temperature (i.e., lower than 36° C.), the reaction mixture separates into an upper phase containing a reaction product and a lower phase containing the catalyst.

With respect to the perfluorinated aromatic hydrocarbon (C), there is no particular limitation as long as an aromatic hydrocarbon is perfluorinated. (In the present invention, the term "aromatic hydrocarbon" includes an aromatic hydrocarbon substituted with an alkyl group or groups.) However, $C_6$–$C_{10}$ perfluorinated aromatic hydrocarbons are preferred. Examples of such perfluorinated aromatic hydrocarbons include perfluorobenzene, perfluorotoluene and perfluoroxylene. These hydrocarbons can be used individually or in combination.

In the second form of the Lewis acid catalyst composition of the present invention in which the mixed medium (I) comprises the perfluorinated aliphatic hydrocarbon or alicyclic hydrocarbon (A), the non-fluorinated hydrocarbon (B) and the perfluorinated aromatic hydrocarbon (C), it is preferred that the volume of each of media (A), (B) and (C) is, individually, 10% by volume or more, based on the whole volume of the mixed medium. Moreover, the ratio of the total volume of the perfluorinated aliphatic hydrocarbon or alicyclic hydrocarbon (A) and the non-fluorinated hydrocarbon (B) to the volume of the perfluorinated aromatic hydrocarbon (C) is preferably 1.5 or more, more preferably 2 or more. When the ratio of the total volume of the perfluorinated aliphatic hydrocarbon or alicyclic hydrocarbon (A) and the non-fluorinated hydrocarbon (B) to the volume of the perfluorinated aromatic hydrocarbon (C) is less than 1.5, the phase separation of the mixed medium at room temperature is difficult. On the other hand, when the ratio of the total volume of the perfluorinated aliphatic hydrocarbon or alicyclic hydrocarbon (A) and the non-fluorinated hydrocarbon (B) to the volume of the perfluorinated aromatic hydrocarbon (C) is more than 9, the homogenization of the reaction system by heating becomes difficult depending on the types of media (A), (B) and (C).

The second form of the Lewis acid catalyst composition of the present invention can be employed in general organic reactions using a Lewis acid as a catalyst as described below, wherein the mixed medium comprises the perfluorinated aliphatic hydrocarbon or alicyclic hydrocarbon (A), the non-fluorinated hydrocarbon (B) and the perfluorinated aromatic hydrocarbon (C).

Figure 2:
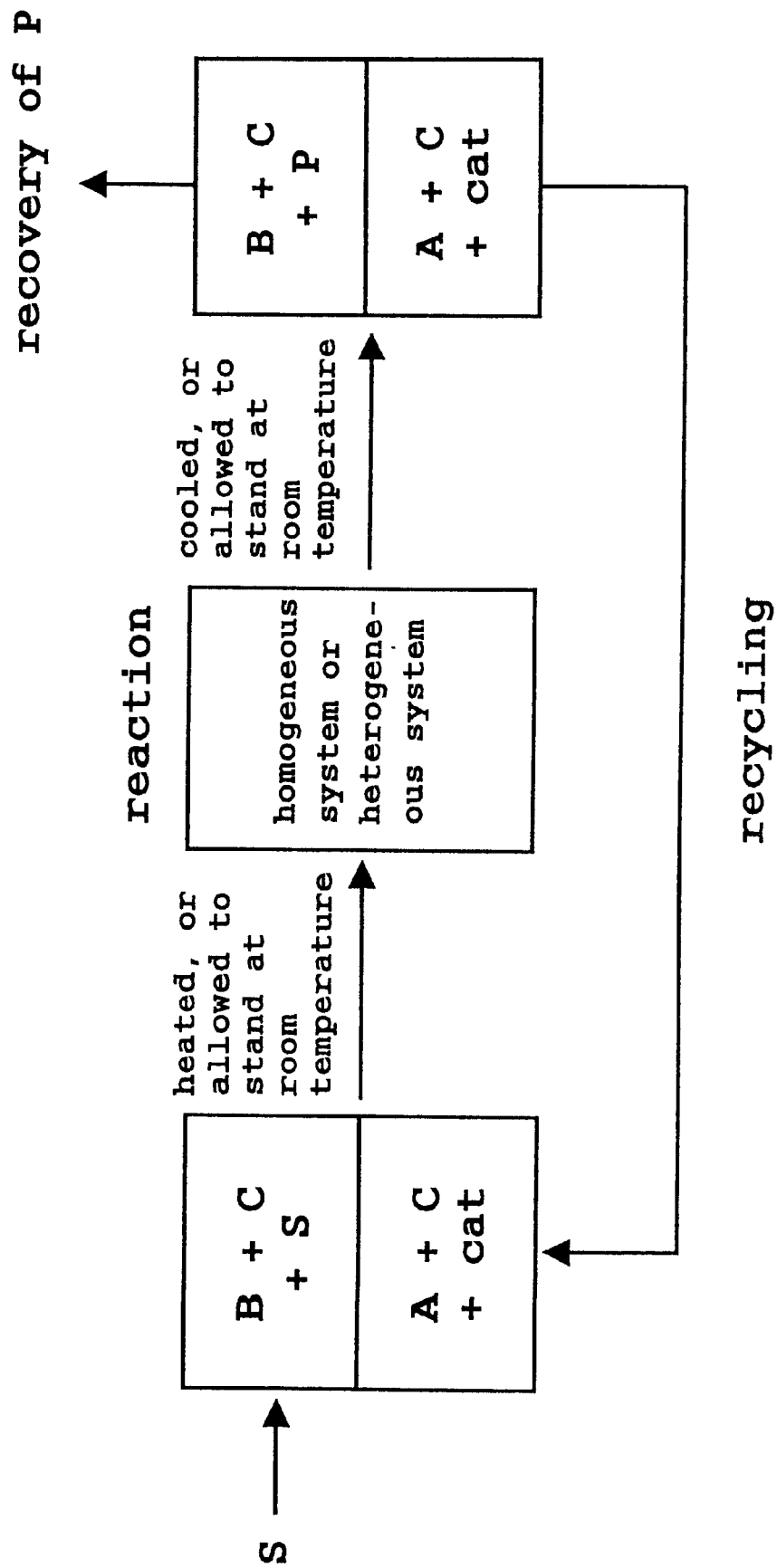
FIG. 2 is a schematic diagram showing the characteristic feature of a reaction system using a second preferred form of the Lewis acid catalyst composition of the present invention.

When an acid catalytic reaction is performed using the second form of the Lewis acid catalyst composition of the present invention wherein the mixed medium comprises the perfluorinated aliphatic hydrocarbon or alicyclic hydrocarbon (A), the non-fluorinated hydrocarbon (B) and the perfluorinated aromatic hydrocarbon (C), as shown in FIG. 2, a nucleophilic reagent or nucleophilic reagents (III) (used as a raw material or raw materials) are mainly dissolved in a phase of media (B) and (C), and the catalyst is mainly dissolved in a phase of media (A) and (C). In the case of this system, the perfluorinated aromatic hydrocarbon (C) is almost evenly partitioned into both phases (A) and (B). When the reaction is performed while heating to 36° C. or more, the reaction system becomes homogeneous. After the reaction, when the resultant reaction mixture is cooled to room temperature, the reaction mixture separates into two phases. That is, a phase composed mainly of the non-fluorinated hydrocarbon (B) forms an upper phase, and a phase composed mainly of the perfluorinated aliphatic hydrocarbon or alicyclic hydrocarbon (A) forms a lower phase. A reaction product can be recovered from the upper phase, and the Lewis acid catalyst can be recycled by recovering the lower phase because almost all of the catalyst is contained in the lower phase.

When a raw material contains water, for example in the form of an aqueous hydrogen peroxide or formalin, the second form of the Lewis acid catalyst composition of the present invention separates into three phases, that is, a phase of the perfluorinated aliphatic hydrocarbon or alicyclic hydrocarbon (A) and the perfluorinated aromatic hydrocarbon (C), a phase of the non-fluorinated hydrocarbon (B) and the perfluorinated aromatic hydrocarbon (C), and an aqueous phase. In this case, in general, the phase composed mainly of the perfluorinated aliphatic hydrocarbon or alicyclic hydrocarbon (A) containing the catalyst forms a lower phase, and the phase composed mainly of the non-fluorinated hydrocarbon (B) containing a water-insoluble raw material, the aqueous phase containing the water-soluble raw material and the lower phase together assume a three-layer configuration. The positions of the phase composed mainly of the non-fluorinated hydrocarbon (B) and the aqueous phase vary depending on the mixed medium, the raw materials, the type of the reaction and the like. When an acid catalytic reaction is performed using such a Lewis acid catalyst composition, the resultant reaction mixture separates into a phase composed mainly of the perfluorinated aliphatic hydrocarbon or alicyclic hydrocarbon (A) containing the catalyst, an aqueous phase, and a phase composed mainly of the non-fluorinated hydrocarbon (B) containing a water-insoluble reaction product. In the case of this system, the reaction product can be recovered from the upper or middle phase, and the Lewis acid catalyst can be recycled by recovering the lower phase because almost all of the catalyst is contained in the lower phase.

The content of water in the second form of the Lewis acid catalyst composition of the present invention is the same as in the above-mentioned first form of the Lewis acid catalyst composition in such a form as additionally contains water.

In a third form of the Lewis acid catalyst composition of the present invention, the mixed medium (I') comprising the perfluorinated aliphatic hydrocarbon or alicyclic hydrocarbon (A), the perfluorinated aromatic hydrocarbon (C) and water (D) is used.

In the third form of the Lewis acid catalyst composition of the present invention in which the mixed medium (I') comprises the perfluorinated aliphatic hydrocarbon or alicyclic hydrocarbon (A), the perfluorinated aromatic hydrocarbon (C) and water (D), the Lewis acid catalyst used in the present invention can hardly be dissolved in a mixture of media (A) and (C) by only mixing the catalyst with the mixed medium (I'). However, in the presence of at least one nucleophilic reagent (III) and the above-mentioned mixed medium (I'), all of the Lewis acid catalyst used in the present invention can be dissolved in the mixture of media (A) and (C). When an acid catalytic reaction is conducted using such a Lewis acid catalyst composition, the same level of reactivity as achieved in the conventional liquid phase reactions can be achieved because the catalyst is dissolved in the mixed medium. Further, when an acid catalytic reaction is performed using the third form of the Lewis acid catalyst composition of the present invention, by only allowing the resultant reaction mixture to stand still at room temperature after the reaction, the Lewis acid catalyst is separated into a phase differing from a phase containing a reaction product. That is, the catalyst is dissolved in a homogeneous phase of the perfluorinated aliphatic hydrocarbon or alicyclic hydrocarbon (A) and the perfluorinated aromatic hydrocarbon (C). On the other hand, when the reaction product is water-soluble, the product is present in an aqueous phase, and when the product is water-insoluble, the product forms a product phase. Therefore, the catalyst can be easily recovered and recycled. The positions of the aqueous phase and the product phase vary depending on the mixed medium, the raw materials, the type of the reaction and the like.

The perfluorinated aliphatic hydrocarbon or alicyclic hydrocarbon (A) and the perfluorinated aromatic hydrocarbon (C) used for the mixed medium (I') are the same as used for the mixed medium (I). It is preferred that the ratio of the volume of the perfluorinated aliphatic hydrocarbon or alicyclic hydrocarbon (A) to the volume of the perfluorinated aromatic hydrocarbon (C) is from 3 to 10. When the ratio of the volume of the perfluorinated aliphatic hydrocarbon or alicyclic hydrocarbon (A) to the volume of the perfluorinated aromatic hydrocarbon (C) is less than 3, the reaction product is likely to be dissolved in the homogeneous phase of media (A) and (C), so that the separation between the catalyst and the product becomes difficult. When the ratio of the volume of the perfluorinated aliphatic hydrocarbon or alicyclic hydrocarbon (A) to the volume of the perfluorinated aromatic hydrocarbon (C) is more than 10, the solubility of the catalyst in medium (A) is lowered.

The content of water in the mixed medium (I') is preferably from 10 to 95% by volume, more preferably from 20 to 80% by volume, based on the whole volume of the mixed medium containing water. When the content of water is less than 10% by volume, the phase separation of the mixed medium is difficult. When the content of water is more than 95% by volume, the phase separation of the mixed medium is also difficult.

The third form of the Lewis acid catalyst composition of the present invention need not use an organic solvent having flammability, and is a safe and clean reaction system. Therefore, the third form of the Lewis acid catalyst composition of the present invention can be applied to reactions which are accelerated in water as described below. Further, by the use of the third form of the Lewis acid catalyst composition of the present invention, an explosive oxidation can be conducted with safety.

Figure 3:
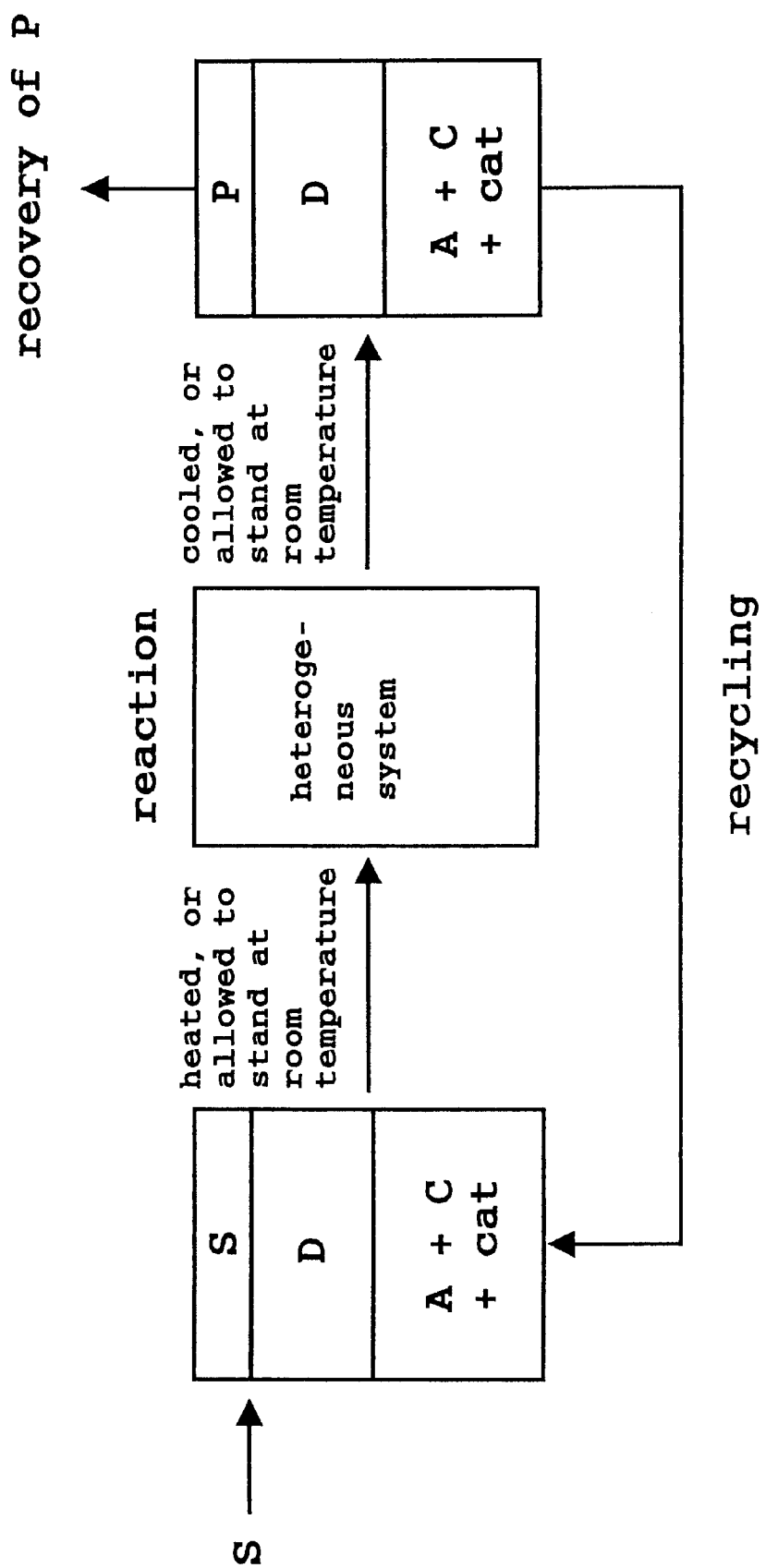
FIG. 3 is a schematic diagram showing the characteristic feature of a reaction system using a third preferred form of the Lewis acid catalyst composition of the present invention.

When an acid catalytic reaction is performed using the third form of the Lewis acid catalyst composition of the present invention wherein the mixed medium (I') comprises the perfluorinated aliphatic hydrocarbon or alicyclic hydrocarbon (A), the perfluorinated aromatic hydrocarbon (C) and water (D), as shown in FIG. 3, a nucleophilic reagent or nucleophilic reagents (III) (used as a raw material or raw materials) are dissolved in water (D) or form a raw material phase depending on the solubility thereof in water. The catalyst is dissolved in a homogeneous phase of the perfluorinated aliphatic hydrocarbon or alicyclic hydrocarbon (A) and the perfluorinated aromatic hydrocarbon (C). Water and a perfluorocarbon are not mutually soluble. Therefore, this reaction system is heterogeneous. After the reaction, by allowing the resultant reaction mixture to stand still at room temperature, the homogeneous phase of the perfluorinated aliphatic hydrocarbon or alicyclic hydrocarbon (A) and the perfluorinated aromatic hydrocarbon (C) containing the catalyst forms a lower phase, and a reaction product phase and an aqueous phase form an upper phase and a middle phase. The positions of the aqueous phase and the reaction product phase vary depending on the raw materials, the type of the reaction and the like. The reaction product can be recovered from the product phase, and the Lewis acid catalyst can be recycled by recovering the lower phase because almost all of the catalyst is contained in the lower phase.

The Lewis acid catalyst composition of the present invention can be employed in a liquid phase reaction wherein at least one nucleophilic reagent (III) is used as a raw material, and wherein the above-mentioned mixed medium (I) or (I') is used as a reaction medium in the presence of at least one Lewis acid catalyst (II) selected from the group consisting of the rare earth salt of a perfluoroalkylsulfonate represented by formula (1), the rare earth salt of a bis(perfluoroalkylsulfonyl)imide represented by formula (2) and the rare earth salt of a tris(perfluoroalkylsulfonyl)methide represented by formula (3).

The nucleophilic reagent used as a raw material in a Lewis acid catalytic reaction means a compound which has an affinity to a cation present in the Lewis acid and which is capable of coordinating with the cation. As an example of such a nucleophilic reagent, a compound which contains an element, such as oxygen, nitrogen or sulfur, can be mentioned wherein the element has a lone pair therein. Examples of nucleophilic reagents include alcohols, phenols, ethers, sulfides, aldehydes, ketones, carboxylic acids, acid anhydrides, acid halides, esters, thioesters, lactones, nitro compounds and nitriles. As another example of the nucleophilic reagent, an unsaturated hydrocarbon can be mentioned wherein the unsaturated hydrocarbon has an affinity to a cation present in the Lewis acid and is capable of coordinating with the cation. Examples of such unsaturated hydrocarbons include nucleophilic olefins.

The Lewis acid catalyst composition of the present invention can be employed in a reaction using, as a raw material or raw materials, a nucleophilic reagent or nucleophilic reagents. A Lewis acid is widely used as a catalyst for various catalytic reactions. In the present invention, the Lewis acid catalyst composition can be employed in reactions, such as the Friedel-Crafts reaction, the Diels-Alder reaction, a dehydration reaction of an alcohol, an aldol reaction, a synthesis reaction of a Schiff base, the Meerwein-Ponndorf-Verley reduction reaction, the Michael reaction, the Mannich reaction, an esterification reaction, a transesterification reaction, the Fries rearrangement reaction, an O-glycosidation reaction, a polymerization reaction of an olefin, an oxidation reaction with hydrogen peroxide or an organic peroxide and a methylolation reaction of a benzene nucleus.

Hereinbelow, an explanation is made with respect to these reactions.

(a) The Friedel-Crafts reaction is a reaction for synthesizing an aromatic hydrocarbon substituted with an alkyl or acyl group, in which an aromatic hydrocarbon is reacted with an olefin, an acid anhydride or an acid halide.

(b) The Diels-Alder reaction is a reaction for producing an unsaturated six-ring compound in which a compound having a double or triple bond (i.e., a dienophile) is added to a compound having a conjugated double bond (i.e., a diene) at carbons of 1- and 4-positions thereof. Examples of dienes include butadiene substituted with an alkyl group or groups, cyclopentadiene, cyclohexadiene, anthracene and derivatives of these compounds, as well as compounds in which a carbon atom in a conjugated double bond is replaced by a nitrogen atom (for example —C=C—N=C—). Examples of dienophiles include maleic anhydride, p-benzoquinone, methyl vinyl ketone and styrene.

(c) The dehydration reaction of an alcohol is a reaction for producing an ether by intermolecular dehydration of one or more alcohols or phenols.

(d) As an example of the aldol reaction, a reaction can be mentioned, in which, to a carbonyl compound having at least one hydrogen atom at α-carbon (i.e., an aldehyde or ketone) is added the same or a different carbonyl compound for producing an β-hydroxycarbonyl compound. For example, from 2 moles of acetaldehyde, 1 mole of 3-hydroxybutylaldehyde is stoichiometrically produced. Further, as another example of the aldol reaction, the Mukaiyama aldol reaction can also be mentioned, in which, for example, a derivative of 3-silyloxyhydrocinnamic acid is produced from benzaldehyde and a silyl enol ether as shown in Examples.

(e) The synthesis reaction of a Schiff base is a reaction for producing an azomethine compound by a condensation reaction between an aldehyde and a primary amine.

(f) The Meerwein-Ponndorf-Verley reduction reaction is a reaction in which a carbonyl compound is reacted with a sec-alcohol for reducing the carbonyl compound to an alcohol corresponding to the carbonyl compound and then oxidizing the sec-alcohol to a ketone corresponding to the sec-alcohol.

(g) The Michael reaction is a reaction in which a compound having an active methylene group, such as an acetoacetic ester, a malonic ester or a cyanoacetic ester, is caused to be addition-bonded to the β-carbon of an unsaturated compound having a strongly negative group at α-carbon. For example, by reacting diethyl malonate with ethyl cinnamate, ethyl 3-bis(ethoxycarbonyl) methylhydrocinnamate is produced.

(h) The Mannich reaction is a one-step aminomethylation reaction of a compound having an active methylene group, in which, by reacting the compound with formaldehyde and a compound selected from the group consisting of ammonium, a primary amine and a secondary amine, an aminomethyl group derived from the formaldehyde and the ammonium or amine is added to the active methylene group.

(i) The esterification reaction is a reaction in which, by reacting a free acid (such as a carboxylic acid) or an acid anhydride with an alcohol, an ester corresponding to the alcohol is produced.

(j) The transesterification reaction is a reaction in which, by reacting an ester with an alcohol (or a phenol), a free acid (such as a carboxylic acid) or a different ester, the acid or alcohol component in the ester is replaced by a different acid or alcohol component.

(k) The Fries rearrangement reaction is a reaction in which an acyl group of a phenyl carboxylate is rearranged to the ortho- or para-position of the phenyl group, so that an o- or p-acylphenol compound corresponding to the acyl group is produced.

(l) The O-glycosidation reaction is a reaction in which the hydroxyl group of a hemiacetal in a sugar is alkylated or esterified.

(m) The polymerization reaction of an olefin means a reaction in which a compound having an ethylenically unsaturated bond is polymerized, so that an oligomer or polymer thereof is produced. Examples of compounds having an ethylenically unsaturated bond include olefins (such as ethylene, propylene and butadiene), styrenes, vinyl halides, vinyl ether, allyl ether, (meth)acrolein, vinyl ketone, vinyl esters, (meth)acrylate compounds (such as methyl methacrylate), (meth)acrylonitrile and diallyl phthalate.

(n) Examples of oxidation reactions by hydrogen peroxide or an organic peroxide include an oxidation of a compound having an ethylenically unsaturated bond and the Baeyer-Villiger reaction in which, by oxidizing a ketone, an ester corresponding to the ketone is produced. In the latter oxidation reaction, when a cyclic ketone is used, a lactone is produced. In such oxidations, even if an aqueous hydrogen peroxide is used as a raw material (i.e., the Lewis acid catalyst composition is caused to contain water), the Lewis acid catalyst of the present invention is not decomposed or deteriorated.

(o) With respect to the methylolation reaction of a benzene nucleus, a reaction can be mentioned in which, by reacting a phenol and formaldehyde, a novolak type methylolated phenol is produced. In this methylolation, formalin is generally used as a raw material.

When an acid catalytic reaction is performed using the first form of the Lewis acid catalyst composition of the present invention in which the mixed medium comprises the perfluorinated aliphatic hydrocarbon or alicyclic hydrocarbon (A) and the non-fluorinated hydrocarbon (B), the catalyst is dissolved in the perfluorinated aliphatic hydrocarbon or alicyclic hydrocarbon (A) and a raw material or raw materials are dissolved in the non-perfluorinated hydrocarbon (B). Further, even when the reaction system is heated to about 80° C., the reaction system separates into two phases, that is, a perfluorinated aliphatic hydrocarbon or alicyclic hydrocarbon (A) phase and a non-fluorinated hydrocarbon (B) phase. Therefore, it is preferred to stir the reaction system during the reaction. However, the raw material or materials are able to be dissolved in the phase containing the catalyst in an amount of about several %, so that the reaction proceeds even when the reaction system is allowed to stand still.

When an acid catalytic reaction is performed using the second form of the Lewis acid catalyst composition of the present invention in which the mixed medium comprises the perfluorinated aliphatic hydrocarbon or alicyclic hydrocarbon (A), the non-fluorinated hydrocarbon (B) and the perfluorinated aromatic hydrocarbon (C), the catalyst and a raw material or raw materials are respectively dissolved in a phase of the perfluorinated aliphatic hydrocarbon or alicyclic hydrocarbon (A) and a phase of the non-fluorinated hydrocarbon (B). The perfluorinated aromatic hydrocarbon (C) is partitioned into the perfluorinated aliphatic hydrocarbon or alicyclic hydrocarbon (A) phase and the non-fluorinated hydrocarbon (B) phase. When this reaction system is heated to 36° C. or more, the reaction system becomes homogeneous, so that the reaction is accelerated. Therefore, the second form of the Lewis acid catalyst composition of the present invention is advantageously used for a reaction in which the reaction system is heated to the above-mentioned temperature.

When an acid catalytic reaction is performed using the third form of the Lewis acid catalyst composition of the present invention in which the mixed medium comprises the perfluorinated aliphatic hydrocarbon or alicyclic hydrocarbon (A), the perfluorinated aromatic hydrocarbon (C) and water (D), the reaction system separates into two phases, that is, a homogeneous phase of the perfluorinated aliphatic hydrocarbon or alicyclic hydrocarbon (A) and the perfluorinated aromatic hydrocarbon (C), and an aqueous phase. In this case, the catalyst is dissolved in the phase of the perfluorinated aliphatic hydrocarbon or alicyclic hydrocarbon (A) and the perfluorinated aromatic hydrocarbon (C). The raw material or materials are generally present in the interface of the mixed medium. When a hydrophilic raw material is used, a part of the raw material is dissolved in the aqueous phase. In this reaction system, the conventional organic solvents which are harmful to human need not be used. Therefore, this reaction system is a clean system. Further, the third form of the Lewis acid catalyst composition of the present invention is advantageously used for a reaction which is accelerated in water, such as the Diels-Alder reaction. Moreover, by the use of the third form of the Lewis acid catalyst composition of the present invention, an oxidation reaction using hydrogen peroxide, which is in danger of explosion, can be performed with safety.

In the present invention, the Lewis acid catalyst is a specific metal complex as mentioned above, and in the presence of a nucleophilic reagent as a raw material, the solubility of the catalyst in the perfluorinated medium is remarkably increased as mentioned above. Further, the catalyst used in the present invention has high catalytic activity (i.e., the reaction rate is high) and is stable to water, as compared to other known Lewis acid catalysts, such as aluminum chloride, boron trifluoride and titanium tetrachloride. Therefore, the Lewis acid catalyst composition of the present invention can be used not only for an acid catalytic reaction in which water is used as a reaction medium but also for an acid catalytic reaction in which a reagent, such as hydrogen peroxide or formaldehyde, is used as a raw material, wherein the reagent is sold in the form of an aqueous solution. Further, by the use of the Lewis acid catalyst composition of the present invention, it is advantageous not only in that the Lewis acid catalytic reaction generally proceeds under mild conditions wherein, for example, the amount of the catalyst is small and the reaction temperature is low as compared to those employed in the conventional catalytic reactions, but also in that the selectivity and yield in the reaction are increased.

In the present invention, the separation between a reaction product and the Lewis acid catalyst can be performed easily. When the first or second form of the Lewis acid catalyst composition of the present invention is used, wherein the mixed medium (I) comprises the perfluorinated aliphatic hydrocarbon or alicyclic hydrocarbon (A) and the non-fluorinated hydrocarbon (B) (the first form) or the mixed medium (I) comprises not only media (A) and (B) but also the perfluorinated aromatic hydrocarbon (C) (the second form), the reaction product can be recovered by a method which comprises withdrawing a phase of medium (B) (or media (B) and (C)) containing the product from the reaction mixture separated, and then removing the medium (B) (or media (B) and (C)) from the phase containing the product by, for example, distillation. When the third form of the Lewis acid catalyst composition of the present invention is used, wherein the mixed medium (I') comprises the perfluorinated aliphatic hydrocarbon or alicyclic hydrocarbon (A), the perfluorinated aromatic hydrocarbon (C) and water (D), the product can be recovered by a method which comprises withdrawing a product phase and an aqueous phase from the reaction mixture, and then extracting the product with, for example, dichloroethane. On the other hand, with respect to the Lewis acid catalyst, the non-fluorinated hydrocarbon (B) containing the raw material or materials and optionally the perfluorinated aromatic hydrocarbon (C) are added to the phase containing the catalyst, and the resultant Lewis acid catalyst composition is recycled. Even when the Lewis acid catalyst composition of the present invention is repeatedly used for a batch cycle reaction, the catalytic activity is not lowered.

When the Lewis acid catalyst composition of the present invention is used for acid catalytic reactions, the molar ratio of the Lewis acid catalyst (II) to the nucleophilic reagent is in the range of from 0.0001 to 10, preferably from 0.001 to 1.

When an acid catalytic reaction is performed using the Lewis acid catalyst composition of the present invention, the reaction temperature is generally 200° C. or less, preferably from −10 to 170° C., more preferably from 0 to 150° C.

In the Lewis acid catalyst composition of the present invention, the amount of the mixed medium (I) or (I') is not less than the amount of the Lewis acid catalyst (II). A preferred amount of the mixed medium varies depending on the type of the reaction. However, the amount ratio of the mixed medium to the catalyst is generally from 2 to 100,000, preferably from 2 to 10,000.

In the present invention, the reaction time varies depending on the amount of the Lewis acid catalyst (II) and the reaction temperature; however, a period of time of from several minutes to 72 hours is preferred.

In still another aspect of the present invention, there is provided a Lewis acid catalyst which is a compound represented by the following formula (3):

$$[(R_fSO_2)_3C]_nM \qquad (3)$$

wherein $R_f$ represents a perfluoroalkyl group having 2 or more carbon atoms, M represents a rare earth element, and n represents an integer equivalent to the valence of M.

The rare earth salt of a tris(perfluoroalkylsulfonyl) methide represented by formula (3) is novel. This novel Lewis acid catalyst is stable to water and has high catalytic activity, as compared to the Lewis acid catalysts represented by formulae (1) and (2) mentioned above.

The novel Lewis acid catalyst of the present invention can be produced as follows. In general, a tris(perfluoroalkylsulfonyl)methide and a compound selected from the group consisting of a carbonate, oxide, acetate and hydroxide of a rare earth element are reacted with each other in an aqueous medium, an organic solvent or a mixed solvent of water and an organic solvent at a temperature of from room temperature to 100° C. After the reaction, the water and/or the organic solvent are distilled by heating under reduced pressure, thereby producing the above-mentioned Lewis acid catalyst. The above-mentioned tris(perfluoroalkylsulfonyl)methide can be produced in accordance with the method described in U.S. Pat. No. 5,554,664.

The novel Lewis acid catalyst of the present invention obtained by the above-mentioned method can be used for the conventional liquid phase reactions as shown in Examples 45 to 51, as well as for the Lewis acid catalyst composition of the present invention. The reaction conditions and the like of a reaction using the novel Lewis acid catalyst of the present invention are the same as employed in the above-mentioned reactions using the Lewis acid catalyst composition of the present invention. By the use of the Lewis acid catalyst of the present invention represented by formula (3) for the Lewis acid catalyst composition of the present invention, not only can a high catalytic activity which has not been exerted with the conventional Lewis acid catalysts be achieved, but also the catalytic activity is not lowered even when the catalyst is repeatedly used.

BEST MODE FOR CARRYING OUT THE INVENTION

Hereinbelow, the present invention will be described in more detail with reference to the following Reference Examples, Examples and Comparative Examples, which should not be construed as limiting the scope of the present invention.

Reference Example 1
(The Lewis Acid Catalyst Cannot be Dissolved in Medium (A) Used Alone.)

To 8 ml of perfluorocyclohexane (as a perfluorinated aliphatic hydrocarbon or alicyclic hydrocarbon) was added 620 mg of ytterbium tris(bis(perfluorooctanesulfonyl)imide) (as a Lewis acid), followed by stirring at 25° C. for 2 hours. The ytterbium tris(bis(perfluorooctanesulfonyl)imide) was not able to be dissolved in the perfluorocyclohexane.

Reference Example 2
(The Lewis Acid Catalyst Cannot be Dissolved in Medium (A) Used Alone Even in the Presence of a Nucleophilic Reagent.)

To 8 ml of perfluorocyclohexane (as a perfluorinated aliphatic hydrocarbon or alicyclic hydrocarbon) were added 620 mg of ytterbium tris(bis(perfluorooctanesulfonyl)imide) (as a Lewis acid) and 496 µl of methyl vinyl ketone (as a nucleophilic reagent), followed by stirring at 25° C. for 2 hours. The ytterbium tris(bis(perfluorooctanesulfonyl)imide) was not able to be dissolved in the perfluorocyclohexane.

Reference Example 3
(The Lewis Acid Catalyst Can be Dissolved in Medium (A) Only in the Presence of Both a Nucleophilic Reagent and Medium (B).)

To 8 ml of perfluorocyclohexane (as a perfluorinated aliphatic hydrocarbon or alicyclic hydrocarbon) were added 620 mg of ytterbium tris(bis(perfluorooctanesulfonyl)imide) (as a Lewis acid) and 496 µl of methyl vinyl ketone (as a nucleophilic reagent). Subsequently, added thereto was 8 ml of dichloroethane (as a non-fluorinated hydrocarbon). The resultant mixture was stirred at 25° C. for 2 hours, and then, allowed to stand still at room temperature. Consequently, the mixture separated into two phases, namely an upper phase of dichloroethane and a lower phase of perfluorocyclohexane. Each of the upper phase and the lower phase was individually subjected to atomic emission spectrometry. It was found that the ytterbium tris(bis(perfluorooctanesulfonyl)imide) was dissolved in the perfluorocyclohexane phase (i.e., lower phase).

Reference Example 4
(The Lewis Acid Catalyst Can be Dissolved in Medium (A) Only in the Presence of Both a Nucleophilic Reagent and Medium (B).)

To 8 ml of perfluorocyclohexane (as a perfluorinated aliphatic hydrocarbon or alicyclic hydrocarbon) were added 620 mg of ytterbium tris(bis(perfluorooctanesulfonyl)imide) (as a Lewis acid) and 496 µl of methyl vinyl ketone (as a nucleophilic reagent). Subsequently, added thereto were 448 µl of 2,3-dimethylbutadiene and 8 ml of dichloroethane (as a non-fluorinated hydrocarbon). The resultant mixture was stirred at 25° C. for 2 hours, and then, allowed to stand still at room temperature. Consequently, the mixture separated into two phases, namely an upper phase of dichloroethane and a lower phase of perfluorocyclohexane. Each of the upper phase and the lower phase was individually subjected to atomic emission spectrometry. It was found that the ytterbium tris(bis(perfluorooctanesulfonyl)imide) was dissolved in the perfluorocyclohexane phase (i.e., lower phase).

Reference Examples 5 to 8
(Another Example Showing that the Lewis Acid Catalyst Can be Dissolved in Medium (A) Only in the Presence of Both a Nucleophilic Reagent and Medium (B).)

The solubility of a Lewis acid was evaluated in substantially the same manner as in Reference Examples 1 to 4, except that ytterbium tris(tris(perfluorooctanesulfonyl)methide) was employed as a Lewis acid instead of the ytterbium tris(bis(perfluorooctanesulfonyl)imide). The Lewis acid was able to be dissolved in a perfluorinated aliphatic hydrocarbon or alicyclic hydrocarbon only in the presence of a non-fluorinated hydrocarbon and a nucleophilic reagent.

Reference Examples 9 to 12
(Still Another Example Showing that the Lewis Acid Catalyst Can be Dissolved in Medium (A) Only in the Presence of Both a Nucleophilic Reagent and Medium (B).)

The solubility of a Lewis acid was evaluated in substantially the same manner as in Reference Examples 1 to 4, except that scandium tris(tris(perfluorooctanesulfonyl)methide) was employed as a Lewis acid instead of the ytterbium tris(bis(perfluorooctanesulfonyl)imide). The Lewis acid was able to be dissolved in a perfluorinated aliphatic hydrocarbon or alicyclic hydrocarbon only in the presence of a non-fluorinated hydrocarbon and a nucleophilic reagent.

Reference Examples 13 to 16
(A Further Example Showing that the Lewis Acid Catalyst Can be Dissolved in Medium (A) Only in the Presence of Both a Nucleophilic Reagent and Medium (B).)

The solubility of a Lewis acid was evaluated in substantially the same manner as in Reference Examples 1 to 4, except that toluene was employed as a non-fluorinated hydrocarbon instead of the dichloroethane. The Lewis acid was able to be dissolved in a perfluorinated aliphatic hydrocarbon or alicyclic hydrocarbon only in the presence of a non-fluorinated hydrocarbon and a nucleophilic reagent.

Reference Examples 17 to 20
(Still a Further Example Showing that the Lewis Acid Catalyst Can be Dissolved in Medium (A) Only in the Presence of Both a Nucleophilic Reagent and Medium (B).)

The solubility of a Lewis acid was evaluated in substantially the same manner as in Reference Examples 1 to 4, except that chlorobenzene was employed as a non-fluorinated hydrocarbon instead of the dichloroethane. The Lewis acid was able to be dissolved in a perfluorinated aliphatic hydrocarbon or alicyclic hydrocarbon only in the presence of a non-fluorinated hydrocarbon and a nucleophilic reagent.

Reference Examples 21 to 24
(Still a Further Example Showing that the Lewis Acid Catalyst Can be Dissolved in Medium (A) Only in the Presence of Both a Nucleophilic Reagent and Medium (B).)

The solubility of a Lewis acid was evaluated in substantially the same manner as in Reference Examples 1 to 4, except that acetic anhydride was employed as a nucleophilic reagent instead of the methyl vinyl ketone. The Lewis acid was able to be dissolved in a perfluorinated aliphatic hydrocarbon or alicyclic hydrocarbon only in the presence of a non-fluorinated hydrocarbon and a nucleophilic reagent.

EXAMPLE 1

As a Lewis acid catalyst, ytterbium tris(bis(perfluorooctanesulfonyl)imide) was added to a mixed medium of 4 ml of perfluoromethylcyclohexane and 4 ml of dichloroethane, thereby obtaining a Lewis acid catalyst composition. The amount of Lewis acid catalyst added was adjusted so that it would be 5 mol %, based on the molar amount of 2,3-dimethylbutadiene to be added to the Lewis acid catalyst composition. To the obtained Lewis acid catalyst composition were added 224 μl of 2,3-dimethylbutadiene and 248 μl of methyl vinyl ketone, followed by stirring to thereby effect a reaction between the 2,3-dimethylbutadiene and the methyl vinyl ketone at 25° C. for 10 hours. The resultant reaction mixture was allowed to stand still at room temperature, so that the reaction mixture separated into an upper phase of dichloroethane and a lower phase of perfluoromethylcyclohexane. Each of the upper phase and the lower phase was individually analyzed by gas chromatography. It was found that the overall yield of the reaction product (i.e., 4-acetyl-1,2-dimethylcyclohexene) in the upper and lower phases was 86%, wherein 98% of the produced 4-acetyl-1,2-dimethylcyclohexene was present in the upper phase and 2% of the produced 4-acetyl-1,2-dimethylcyclohexene was present in the lower phase. Subsequently, the amounts of ytterbium tris(bis (perfluorooctanesulfonyl)imide) present in the upper phase and the lower phase were individually measured in terms of the amounts of ytterbium by atomic emission spectrometry. It was found that not less than 99% of the Lewis acid catalyst was present in the lower phase.

It was confirmed that when the reaction is performed using the Lewis acid catalyst composition of the present invention, the product and the catalyst are separately dissolved in dichloroethane and perfluoromethylcyclohexane, respectively, so that separation therebetween can be performed easily.

EXAMPLE 2

224 μl of 2,3-dimethylbutadiene and 248 μl of methyl vinyl ketone were added to a mixed medium of 4 ml of perfluoromethylcyclohexane and 4 ml of dichloroethane. To the resultant mixture was added 5 mol % of ytterbium tris(bis(perfluorooctanesulfonyl)imide) (as a Lewis acid catalyst), based on the molar amount of the 2,3-dimethylbutadiene, thereby obtaining a Lewis acid catalyst composition containing the 2,3-dimethylbutadiene and the methyl vinyl ketone. The obtained Lewis acid catalyst composition containing the 2,3-dimethylbutadiene and the methyl vinyl ketone was stirred to thereby effect a reaction between the 2,3-dimethylbutadiene and the methyl vinyl ketone at 25° C. for 10 hours. The resultant reaction mixture was allowed to stand still at room temperature, so that the reaction mixture separated into an upper phase of dichloroethane and a lower phase of perfluoromethylcyclohexane. Each of the upper phase and the lower phase was individually analyzed by gas chromatography. It was found that the overall yield of the reaction product (i.e., 4-acetyl-1,2-dimethylcyclohexene) in the upper and lower phases was 86%, wherein 98% of the produced 4-acetyl-1,2-dimethylcyclohexene was present in the upper phase and 2% of the produced 4-acetyl-1,2-dimethylcyclohexene was present in the lower phase. Subsequently, the amounts of ytterbium tris(bis(perfluorooctanesulfonyl)imide) present in the upper phase and the lower phase were individually measured in terms of the amounts of ytterbium by atomic emission spectrometry. It was found that not less than 99% of the Lewis acid catalyst was present in the lower phase.

It was confirmed that when the reaction is performed using the Lewis acid catalyst composition of the present invention, the product and the catalyst are separately dissolved in dichloroethane and perfluoromethylcyclohexane, respectively, so that separation therebetween can be performed easily.

EXAMPLE 3

224 μl of 2,3-dimethylbutadiene and 248 μl of methyl vinyl ketone were added to a mixed medium of 3 ml of perfluoromethylcyclohexane and 5 ml of dichloromethane. To the resultant mixture was added 3 mol % of scandium tris(bis(perfluorooctanesulfonyl)imide) (as a Lewis acid catalyst), based on the molar amount of the 2,3-dimethylbutadiene, thereby obtaining a Lewis acid catalyst composition containing the 2,3-dimethylbutadiene and the methyl vinyl ketone. The obtained Lewis acid catalyst composition containing the 2,3-dimethylbutadiene and the methyl vinyl ketone was stirred to thereby effect a reaction between the 2,3-dimethylbutadiene and the methyl vinyl ketone at 25° C. for 8 hours. The resultant reaction mixture was allowed to stand still at room temperature, so that the reaction mixture separated into an upper phase of dichloromethane and a lower phase of perfluoromethylcyclohexane. Each of the upper phase and the lower phase was individually analyzed by gas chromatography. It was found that the overall yield of the reaction product (i.e., 4-acetyl-1,2-dimethylcyclohexene) in the upper and lower phases was 88%, wherein 99% of the produced 4-acetyl-1,2-dimethylcyclohexene was present in the upper phase and 1% of the produced 4-acetyl-1,2-dimethylcyclohexene was present in the lower phase. Subsequently, the amounts of scandium tris(bis(perfluorooctanesulfonyl)imide) present in the upper phase and the lower phase were individually measured in terms of the amounts of scandium by atomic emission spectrometry. It was found that not less than 99% of the Lewis acid catalyst was present in the lower phase.

It was confirmed that when the reaction is performed using the Lewis acid catalyst composition of the present invention, the product and the catalyst are separately dissolved in dichloromethane and perfluoromethylcyclohexane, respectively, so that separation therebetween can be performed easily.

EXAMPLE 4

224 μl of 2,3-dimethylbutadiene and 248 μl of methyl vinyl ketone were added to a mixed medium of 4 ml of perfluorohexane and 5 ml of toluene. To the resultant mixture was added 6 mol % of lanthanum tris(bis (perfluorooctanesulfonyl)imide) (as a Lewis acid catalyst), based on the molar amount of the 2,3-dimethylbutadiene, thereby obtaining a Lewis acid catalyst composition containing the 2,3-dimethylbutadiene and the methyl vinyl ketone. The obtained Lewis acid catalyst composition containing the 2,3-dimethylbutadiene and the methyl vinyl ketone was stirred to thereby effect a reaction between the 2,3-dimethylbutadiene and the methyl vinyl ketone at 25° C. for 11 hours. The resultant reaction mixture was allowed to stand still at room temperature, so that the reaction mixture separated into an upper phase of toluene and a lower phase of perfluorohexane. Each of the upper phase and the lower phase was individually analyzed by gas chromatography. It was found that the overall yield of the reaction product (i.e., 4-acetyl-1,2-dimethylcyclohexene) in the upper and lower phases was 86%, wherein 99% of the produced 4-acetyl-1,2-dimethylcyclohexene was present in the upper phase and 1% of the produced 4-acetyl-1,2-dimethylcyclohexene was present in the lower phase. Subsequently, the amounts of lanthanum tris(bis(perfluorooctanesulfonyl)imide) present in the upper phase and the lower phase were individually measured in terms of the amounts of lanthanum by atomic emission spectrometry. It was found that not less than 99% of the Lewis acid catalyst was present in the lower phase.

It was confirmed that when the reaction is performed using the Lewis acid catalyst composition of the present invention, the product and the catalyst are separately dissolved in toluene and perfluorohexane, respectively, so that separation therebetween can be performed easily.

EXAMPLE 5

216 mg of anisole and 410 mg of acetic anhydride were added to a mixed medium of 4 ml of perfluoromethylcyclohexane and 8 ml of chlorobenzene. To the resultant mixture was added 10 mol % of ytterbium tris(bis(perfluorooctanesulfonyl)imide) (as a Lewis acid catalyst), based on the molar amount of the anisole, thereby obtaining a Lewis acid catalyst composition containing the anisole and the acetic anhydride. The obtained Lewis acid catalyst composition containing the anisole and the acetic anhydride was stirred to thereby effect a reaction between the anisole and the acetic anhydride at 70° C. for 7 hours. The resultant reaction mixture was allowed to stand still at room temperature, so that the reaction mixture separated into an upper phase of chlorobenzene and a lower phase of perfluoromethylcyclohexane. Each of the upper phase and the lower phase was individually analyzed by gas chromatography. It was found that the overall yield of the reaction product (i.e., p-methoxyacetophenone) in the upper and lower phases was 78%, wherein 97% of the produced p-methoxyacetophenone was present in the upper phase and 3% of the produced p-methoxyacetophenone was present in the lower phase. Subsequently, the amounts of ytterbium tris(bis(perfluorooctanesulfonyl)imide) present in the upper phase and the lower phase were individually measured in terms of the amounts of ytterbium by atomic emission spectrometry. It was found that not less than 99% of the Lewis acid catalyst was present in the lower phase.

It was confirmed that when the reaction is performed using the Lewis acid catalyst composition of the present invention, the product and the catalyst are separately dissolved in chlorobenzene and perfluoromethylcyclohexane, respectively, so that separation therebetween can be performed easily.

EXAMPLE 6

216 mg of anisole and 410 mg of acetic anhydride were added to a mixed medium of 5 ml of perfluoromethylcyclohexane and 8 ml of chlorobenzene. To the resultant mixture was added 7 mol % of scandium tris(bis(perfluorooctanesulfonyl)imide) (as a Lewis acid catalyst), based on the molar amount of the anisole, thereby obtaining a Lewis acid catalyst composition containing the anisole and the acetic anhydride. The obtained Lewis acid catalyst composition containing the anisole and the acetic anhydride was stirred to thereby effect a reaction between the anisole and the acetic anhydride at 70° C. for 5 hours. The resultant reaction mixture was allowed to stand still at room temperature, so that the reaction mixture separated into an upper phase of chlorobenzene and a lower phase of perfluoromethylcyclohexane. Each of the upper phase and the lower phase was individually analyzed by gas chromatography. It was found that the overall yield of the reaction product (i.e., p-methoxyacetophenone) in the upper and lower phases was 77%, wherein 97% of the produced p-methoxyacetophenone was present in the upper phase and 3% of the produced p-methoxyacetophenone was present in the lower phase. Subsequently, the amounts of scandium tris(bis(perfluorooctanesulfonyl)imide) present in the upper phase and the lower phase were individually measured in terms of the amounts of scandium by atomic emission spectrometry. It was found that not less than 99% of the Lewis acid catalyst was present in the lower phase.

It was confirmed that when the reaction is performed using the Lewis acid catalyst composition of the present invention, the product and the catalyst are separately dissolved in chlorobenzene and perfluoromethylcyclohexane, respectively, so that separation therebetween can be performed easily.

EXAMPLE 7

204 mg of cyclohexanol and 232 mg of acetic anhydride were added to a mixed medium of 4 ml of perfluoromethylcyclohexane and 6 ml of toluene. To the resultant mixture was added 1 mol % of yttrium tris(bis(perfluorooctanesulfonyl)imide) (as a Lewis acid catalyst), based on the molar amount of the cyclohexanol, thereby obtaining a Lewis acid catalyst composition containing the cyclohexanol and the acetic anhydride. The obtained Lewis acid catalyst composition containing the cyclohexanol and the acetic anhydride was stirred to thereby effect a reaction between the cyclohexanol and the acetic anhydride at 25° C. for 30 minutes. The resultant reaction mixture was allowed to stand still at room temperature, so that the reaction mixture separated into an upper phase of toluene and a lower phase of perfluoromethylcyclohexane. Each of the upper phase and the lower phase was individually analyzed by gas chromatography. It was found that the overall yield of the reaction product (i.e., cyclohexyl acetate) in the upper and lower phases was 98%, wherein 99% of the produced cyclohexyl acetate was present in the upper phase and 1% of the produced cyclohexyl acetate was present in the lower phase. Subsequently, the amounts of yttrium tris(bis(perfluorooctanesulfonyl)imide) present in the upper phase and the lower phase were individually measured in terms of the amounts of yttrium by atomic emission spectrometry. It was found that not less than 99% of the Lewis acid catalyst was present in the lower phase.

It was confirmed that when the reaction is performed using the Lewis acid catalyst composition of the present invention, the product and the catalyst are separately dissolved in toluene and perfluoromethylcyclohexane, respectively, so that separation therebetween can be performed easily.

EXAMPLE 8

204 mg of cyclohexanol and 232 mg of acetic anhydride were added to a mixed medium of 6 ml of perfluorohexane and 6 ml of toluene. To the resultant mixture was added 3 mol % of ytterbium tris(perfluorooctanesulfonate) (as a Lewis acid catalyst), based on the molar amount of the cyclohexanol, thereby obtaining a Lewis acid catalyst composition containing the cyclohexanol and the acetic anhydride. The obtained Lewis acid catalyst composition containing the cyclohexanol and the acetic anhydride was stirred to thereby effect a reaction between the cyclohexanol and the acetic anhydride at 25° C. for 30 minutes. The resultant reaction mixture was allowed to stand still at room temperature, so that the reaction mixture separated into an upper phase of toluene and a lower phase of perfluorohexane. Each of the upper phase and the lower phase was individually analyzed by gas chromatography. It was found that the overall yield of the reaction product (i.e., cyclohexyl acetate) in the upper and lower phases was 97%, wherein 99% of the produced cyclohexyl acetate was present in the upper phase and 1% of the produced cyclohexyl acetate was present in the lower phase. Subsequently, the amounts of ytterbium tris(perfluorooctanesulfonate) present in the upper phase and the lower phase were individually measured in terms of the amounts of ytterbium by atomic emission spectrometry. It was found that not less than 99% of the Lewis acid catalyst was present in the lower phase.

It was confirmed that when the reaction is performed using the Lewis acid catalyst composition of the present invention, the product and the catalyst are separately dissolved in toluene and perfluorohexane, respectively, so that separation therebetween can be performed easily.

EXAMPLE 9

81 mg of benzaldehyde and 165 mg of methyl trimethylsilyl dimethylketene acetal were added to a mixed medium of 3 ml of perfluorooctane and 4 ml of toluene. To the resultant mixture was added 1 mol % of ytterbium tris(tris (perfluorooctanesulfonyl)methide) (as a Lewis acid catalyst), based on the molar amount of the benzaldehyde, thereby obtaining a Lewis acid catalyst composition containing the benzaldehyde and the methyl trimethylsilyl dimethylketene acetal. The obtained Lewis acid catalyst composition containing the benzaldehyde and the methyl trimethylsilyl dimethylketene acetal was stirred to thereby effect a reaction between the benzaldehyde and the methyl trimethylsilyl dimethylketene acetal at 40° C. for 15 minutes. The resultant reaction mixture was allowed to stand still at room temperature, so that the reaction mixture separated into an upper phase of toluene and a lower phase of perfluorooctane. Each of the upper phase and the lower phase was individually analyzed by gas chromatography. It was found that the overall yield of the reaction product (i.e., methyl 3-trimethylsilyloxy-2,2-dimethyl-3-phenylpropionate) in the upper and lower phases was 83%, wherein 99% of the produced methyl 3-trimethylsilyloxy-2,2-dimethyl-3-phenylpropionate was present in the upper phase and 1% of the produced methyl 3-trimethylsilyloxy-2,2-dimethyl-3-phenylpropionate was present in the lower phase. Subsequently, the amounts of ytterbium tris(tris (perfluorooctanesulfonyl)methide) present in the upper phase and the lower phase were individually measured in terms of the amounts of ytterbium by atomic emission spectrometry. It was found that not less than 99% of the Lewis acid catalyst was present in the lower phase.

It was confirmed that when the reaction is performed using the Lewis acid catalyst composition of the present invention, the product and the catalyst are separately dissolved in toluene and perfluorooctane, respectively, so that separation therebetween can be performed easily.

EXAMPLE 10

81 mg of benzaldehyde and 165 mg of methyl trimethylsilyl dimethylketene acetal were added to a mixed medium of 2 ml of perfluorohexane and 4 ml of toluene. To the resultant mixture was added 0.5 mol % of scandium tris(tris (perfluorooctanesulfonyl)methide) (as a Lewis acid catalyst), based on the molar amount of the benzaldehyde, thereby obtaining a Lewis acid catalyst composition containing the benzaldehyde and the methyl trimethylsilyl dimethylketene acetal. The obtained Lewis acid catalyst composition containing the benzaldehyde and the methyl trimethylsilyl dimethylketene acetal was stirred to thereby effect a reaction between the benzaldehyde and the methyl trimethylsilyl dimethylketene acetal at 40° C. for 10 minutes. The resultant reaction mixture was allowed to stand still at room temperature, so that the reaction mixture separated into an upper phase of toluene and a lower phase of perfluorohexane. Each of the upper phase and the lower phase was individually analyzed by gas chromatography. It was found that the overall yield of the reaction product (i.e., methyl 3-trimethylsilyloxy-2,2-dimethyl-3-phenylpropionate) in the upper and lower phases was 86%, wherein 99% of the produced methyl 3-trimethylsilyloxy-2,2-dimethyl-3-phenylpropionate was present in the upper phase and 1% of the produced methyl 3-trimethylsilyloxy-2,2-dimethyl-3-phenylpropionate was present in the lower phase.

Subsequently, substantially the same reaction as mentioned above was repeated using the catalyst contained in the lower phase. More sepcifically, the upper phase containing the product was withdrawn from the reaction mixture, and then, to the remainder containing the catalyst were added 4 ml of toluene, 81 mg of benzaldehyde and 165 mg of methyl trimethylsilyl dimethylketene acetal, followed by stirring to thereby effect a reaction at 40° C. for 10 minutes. The resultant reaction mixture was allowed to stand still at room temperature, so that the reaction mixture separated into an upper phase and a lower phase. Each of the upper phase and the lower phase was individually analyzed by gas chromatography. It was found that the overall yield of the reaction product (i.e., methyl 3-trimethylsilyloxy-2,2-dimethyl-3-phenylpropionate) in the upper and lower phases was 85%. Substantially the same procedure as mentioned above was repeated further twice. The overall yields of the reaction product (i.e., methyl 3-trimethylsilyloxy-2,2-dimethyl-3-phenylpropionate) obtained in the upper and lower phases were 83% and 85% in the twice-repeated reactions, respectively.

From the above, it was confirmed that when the reaction is performed using the Lewis acid catalyst composition of the present invention, the product and the catalyst are separately dissolved in toluene and perfluorohexane, so that not only separation between the product and catalyst, but also recovery and recycling of the catalyst can be performed easily.

EXAMPLE 11

As a Lewis acid catalyst, lanthanum tris(tris (perfluorooctanesulfonyl)methide) was added to a mixed medium of 4 ml of perfluorohexane and 4 ml of dichloromethane, thereby obtaining a Lewis acid catalyst composition. The amount of Lewis acid catalyst added was adjusted so that it would be 1 mol %, based on the molar amount of benzaldehyde to be added to the Lewis acid catalyst composition. To the obtained Lewis acid catalyst composition were added 81 mg of benzaldhyde and 165 mg of methyl trimethylsilyl dimethylketene acetal, followed by stirring to thereby effect a reaction between the benzaldehyde and the methyl trimethylsilyl dimethylketene acetal at 40° C. for 10 minutes. The resultant reaction mixture was allowed to stand still at room temperature, so that the reaction mixture separated into an upper phase of dichloromethane and a lower phase of perfluorohexane. Each of the upper phase and the lower phase was individually analyzed by gas chromatography. It was found that the overall yield of the reaction product (i.e., methyl 3-trimethylsilyloxy-2,2-dimethyl-3-phenylpropionate) in the upper and lower phases was 82%, wherein 99% of the produced methyl 3-trimethylsilyloxy-2,2-dimethyl-3-phenylpropionate was present in the upper phase and 1% of the produced methyl 3-trimethylsilyloxy-2,2-dimethyl-3-phenylpropionate was present in the lower phase. Subsequently, the amounts of lanthanum tris(tris (perfluorooctanesulfonyl)methide) present in the upper phase and the lower phase were individually measured in terms of the amounts of lanthanum by atomic emission spectrometry. It was found that not less than 99% of the Lewis acid catalyst was present in the lower phase.

It was confirmed that when the reaction is performed using the Lewis acid catalyst composition of the present invention, the product and the catalyst are separately dissolved in dichloromethane and perfluorohexane, respectively, so that separation therebetween can be performed easily.

EXAMPLE 12

81 mg of benzaldehyde and 165 mg of methyl trimethylsilyl dimethylketene acetal were added to a mixed medium of 4 ml of perfluorohexane and 4 ml of dichloromethane. To the resultant mixture was added 1 mol % of lanthanum tris(tris(perfluorooctanesulfonyl)methide) (as a Lewis acid catalyst), based on the molar amount of the benzaldehyde, thereby obtaining a Lewis acid catalyst composition containing the benzaldehyde and the methyl trimethylsilyl dimethylketene acetal. The obtained Lewis acid catalyst composition containing the benzaldehyde and the methyl trimethylsilyl dimethylketene acetal was stirred to thereby effect a reaction between the benzaldehyde and the methyl trimethylsilyl dimethylketene acetal at 40° C. for 10 minutes. The resultant reaction mixture was allowed to stand still at room temperature, so that the reaction mixture separated into an upper phase of dichloromethane and a lower phase of perfluorohexane. Each of the upper phase and the lower phase was individually analyzed by gas chromatography. It was found that the overall yield of the reaction product (i.e., methyl 3-trimethylsilyloxy-2,2-dimethyl-3-phenylpropionate) in the upper and lower phases was 82%, wherein 99% of the produced methyl 3-trimethylsilyloxy-2,2-dimethyl-3-phenylpropionate was present in the upper phase and 1% of the produced methyl 3-trimethylsilyloxy-2,2-dimethyl-3-phenylpropionate was present in the lower phase. Subsequently, the amounts of lanthanum tris(tris(perfluorooctanesulfonyl)methide) present in the upper phase and the lower phase were individually measured in terms of the amounts of lanthanum by atomic emission spectrometry. It was found that not less than 99% of the Lewis acid catalyst was present in the lower phase.

It was confirmed that when the reaction is performed using the Lewis acid catalyst composition of the present invention, the product and the catalyst are separately dissolved in dichloromethane and perfluorohexane, respectively, so that separation therebetween can be performed easily.

EXAMPLE 13

81 mg of benzaldehyde and 165 mg of methyl trimethylsilyl dimethylketene acetal were added to a mixed medium of 3 ml of perfluorohexane and 4 ml of dichloromethane. To the resultant mixture was added 3 mol % of yttrium tris(tris(perfluorooctanesulfonyl)methide) (as a Lewis acid catalyst), based on the molar amount of the benzaldehyde, thereby obtaining a Lewis acid catalyst composition containing the benzaldehyde and the methyl trimethylsilyl dimethylketene acetal. The obtained Lewis acid catalyst composition containing the benzaldehyde and the methyl trimethylsilyl dimethylketene acetal was stirred to thereby effect a reaction between the benzaldehyde and the methyl trimethylsilyl dimethylketene acetal at 40° C. for 10 minutes. The resultant reaction mixture was allowed to stand still at room temperature, so that the reaction mixture separated into an upper phase of dichloromethane and a lower phase of perfluorohexane. Each of the upper phase and the lower phase was individually analyzed by gas chromatography. It was found that the overall yield of the reaction product (i.e., methyl 3-trimethylsilyloxy-2,2-dimethyl-3-phenylpropionate) in the upper and lower phases was 78%, wherein 98% of the produced methyl 3-trimethylsilyloxy-2,2-dimethyl-3-phenylpropionate was present in the upper phase and 2% of the produced methyl 3-trimethylsilyloxy-2,2-dimethyl-3-phenylpropionate was present in the lower phase. Subsequently, the amounts of yttrium tris(tris(perfluorooctanesulfonyl)methide) present in the upper phase and the lower phase were individually measured in terms of the amounts of yttrium by atomic emission spectrometry. It was found that not less than 99% of the Lewis acid catalyst was present in the lower phase.

It was confirmed that when the reaction is performed using the Lewis acid catalyst composition of the present invention, the product and the catalyst are separately dissolved in dichloromethane and perfluorohexane, respectively, so that separation therebetween can be performed easily.

EXAMPLE 14

216 mg of anisole and 410 mg of acetic anhydride were added to a mixed medium of 4 ml of perfluoromethylcyclohexane and 7 ml of chlorobenzene. To the resultant mixture was added 10 mol % of ytterbium tris(bis(perfluorooctanesulfonyl)imide) (as a Lewis acid catalyst), based on the molar amount of the anisole, thereby obtaining a Lewis acid catalyst composition containing the anisole and the acetic anhydride. The obtained Lewis acid catalyst composition containing the anisole and the acetic anhydride was stirred to thereby effect a reaction between the anisole and the acetic anhydride at 70° C. for 7 hours. The resultant reaction mixture was allowed to stand still at room temperature, so that the reaction mixture separated into an upper phase of chlorobenzene and a lower phase of perfluoromethylcyclohexane. Each of the upper phase and the lower phase was individually analyzed by gas chromatography. It was found that the overall yield of the reaction product (i.e., p-methoxyacetophenone) in the upper and lower phases was 77%.

Subsequently, substantially the same reaction as mentioned above was repeated using the catalyst contained in the lower phase. More specifically, the upper phase containing the product was withdrawn from the reaction mixture, and then, to the remainder containing the catalyst were added 7 ml of chlorobenzene, 216 mg of anisole and 410 mg of acetic anhydride, followed by stirring to thereby effect a reaction at 70° C. for 7 hours. The resultant reaction mixture was allowed to stand still at room temperature, so that the reaction mixture separated into an upper phase and a lower phase. Each of the upper phase and the lower phase was individually analyzed by gas chromatography. It was found that the overall yield of the reaction product (i.e., p-methoxyacetophenone) in the upper and lower phases was 81%. Substantially the same procedure as mentioned above was repeated further twice. The overall yields of the reaction product (i.e., p-methoxyacetophenone) obtained in the upper and lower phases were 83% and 83% in the twice-repeated reactions, respectively.

From the above, it was confirmed that when the reaction is performed using the Lewis acid catalyst composition of the present invention, the product and the catalyst are separately dissolved in chlorobenzene and perfluoromethylcyclohexane, so that not only separation between the product and the catalyst, but also recovery and recycling of the catalyst can be performed easily.

EXAMPLE 15

204 mg of cyclohexanol and 232 mg of acetic anhydride were added to a mixed medium of 4 ml of perfluoromethylcyclohexane and 4 ml of toluene. To the resultant mixture was added 1 mol % of ytterbium tris(bis (perfluorooctanesulfonyl)imide) (as a Lewis acid catalyst), based on the molar amount of the cyclohexanol, thereby obtaining a Lewis acid catalyst composition containing the cyclohexanol and the acetic anhydride. The obtained Lewis acid catalyst composition containing the cyclohexanol and the acetic anhydride was stirred to thereby effect a reaction between the cyclohexanol and the acetic anhydride at 25° C. for 30 minutes. The resultant reaction mixture was allowed to stand still at room temperature, so that the reaction mixture separated into an upper phase of toluene and a lower phase of perfluoromethylcyclohexane. Each of the upper phase and the lower phase was individually analyzed by gas chromatography. It was found that the overall yield of the reaction product (i.e., cyclohexyl acetate) in the upper and lower phases was 98%.

Subsequently, substantially the same reaction as mentioned above was repeated using the catalyst contained in the lower phase. More specifically, the upper phase containing the product was withdrawn from the reaction mixture, and then, to the remainder containing the catalyst were added 4 ml of toluene, 204 mg of cyclohexanol and 232 mg of acetic anhydride, followed by stirring to thereby effect a reaction at 25° C. for 15 minutes. The resultant reaction mixture was allowed to stand still at room temperature, so that the reaction mixture separated into an upper phase and a lower phase. Each of the upper phase and the lower phase was individually analyzed by gas chromatography. It was found that the overall yield of the reaction product (i.e., cyclohexyl acetate) in the upper and lower phases was 99%. Substantially the same procedure as mentioned above was repeated further four times. The overall yields of the reaction product (i.e., cyclohexyl acetate) obtained in the upper and lower phases were 99%, 100%, 99% and 100% in the four times-repeated reactions, respectively.

From the above, it was confirmed that when the reaction is performed using the Lewis acid catalyst composition of the present invention, the product and the catalyst are separately dissolved in toluene and perfluoromethylcyclohexane, so that not only separation between the product and the catalyst, but also recovery and recycling of the catalyst can be performed easily.

EXAMPLE 16

224 µl of 2,3-dimethylbutadiene and 248 µl of methyl vinyl ketone were added to a mixed medium of 4 ml of perfluoromethylcyclohexane and 4 ml of cyclohexane. To the resultant mixture was added 5 mol % of ytterbium tris(bis(perfluorooctanesulfonyl)imide) (as a Lewis acid catalyst), based on the molar amount of the 2,3-dimethylbutadiene, thereby obtaining a Lewis acid catalyst composition containing the 2,3-dimethylbutadiene and the methyl vinyl ketone. The obtained Lewis acid catalyst composition containing the 2,3-dimethylbutadiene and the methyl vinyl ketone was stirred to thereby effect a reaction between the 2,3-dimethylbutadiene and the methyl vinyl ketone at 25° C. for 13 hours. The resultant reaction mixture was allowed to stand still at room temperature, so that the reaction mixture separated into an upper phase of cyclohexane and a lower phase of perfluoromethylcyclohexane. Each of the upper phase and the lower phase was individually analyzed by gas chromatography. It was found that the overall yield of the reaction product (i.e., 4-acetyl-1,2-dimethylcyclohexene) in the upper and lower phases was 87%, wherein 98% of the produced 4-acetyl-1,2-dimethylcyclohexene was present in the upper phase and 2% of the produced 4-acetyl-1,2-dimethylcyclohexene was present in the lower phase. Subsequently, the amounts of ytterbium tris(bis(perfluorooctanesulfonyl)imide) present in the upper phase and the lower phase were individually measured in terms of the amounts of ytterbium by atomic emission spectrometry. It was found that not less than 99% of the Lewis acid catalyst was present in the lower phase.

It was confirmed that when the reaction is performed using the Lewis acid catalyst composition of the present invention, the product and the catalyst are separately dissolved in cyclohexane and perfluoromethylcyclohexane, respectively, so that separation therebetween can be performed easily.

EXAMPLE 17

224 µl of 2,3-dimethylbutadiene and 248 µl of methyl vinyl ketone were added to a mixed medium of 4 ml of perfluoromethylcyclohexane and 3 ml of n-decane. To the resultant mixture was added 3 mol % of scandium tris(bis (perfluorooctanesulfonyl)imide) (as a Lewis acid catalyst), based on the molar amount of the 2,3-dimethylbutadiene, thereby obtaining a Lewis acid catalyst composition containing the 2,3-dimethylbutadiene and the methyl vinyl ketone. The obtained Lewis acid catalyst composition containing the 2,3-dimethylbutadiene and the methyl vinyl ketone was stirred to thereby effect a reaction between the 2,3-dimethylbutadiene and the methyl vinyl ketone at 25° C. for 10 hours. The resultant reaction mixture was allowed to stand still at room temperature, so that the reaction mixture separated into an upper phase of n-decane and a lower phase of perfluoromethylcyclohexane. Each of the upper phase and the lower phase was individually analyzed by gas chromatography. It was found that the overall yield of the reaction product (i.e., 4-acetyl-1,2-dimethylcyclohexene) in the upper and lower phases was 88%, wherein 99% of the produced 4-acetyl-1,2-dimethylcyclohexene was present in the upper phase and 1% of the produced 4-acetyl-1,2-dimethylcyclohexene was present in the lower phase. Subsequently, the amounts of scandium tris(bis (perfluorooctanesulfonyl)imide) present in the upper phase and the lower phase were individually measured in terms of the amounts of scandium by atomic emission spectrometry. It was found that not less than 99% of the Lewis acid catalyst was present in the lower phase.

It was confirmed that when the reaction is performed using the Lewis acid catalyst composition of the present invention, the product and the catalyst are separately dissolved in n-decane and perfluoromethylcyclohexane, respectively, so that separation therebetween can be performed easily.

EXAMPLE 18

As a Lewis acid catalyst, ytterbium tris(bis (perfluorooctanesulfonyl)imide) was added to a mixed medium of 2 ml of perfluorohexane, 4 ml of dichloromethane and 2 ml of perfluorobenzene, thereby obtaining a Lewis acid catalyst composition. The amount of Lewis acid catalyst added was adjusted so that it would be 3 mol %, based on the molar amount of 2,3-dimethylbutadiene to be added to the Lewis acid catalyst composition. To the obtained Lewis acid catalyst composition were added 224 μl of 2,3-dimethylbutadiene and 248 μl of methyl vinyl ketone, followed by stirring to thereby effect a reaction between the 2,3-dimethylbutadiene and the methyl vinyl ketone at 37° C. for 1 hour. The reaction system became homogeneous during the reaction. The resultant reaction mixture was allowed to stand still at room temperature, so that the reaction mixture separated into two phases (an upper phase and a lower phase). Each of the upper phase and the lower phase was individually analyzed by gas chromatography. It was found that the overall yield of the reaction product (i.e., 4-acetyl-1,2-dimethylcyclohexene) in the upper and lower phases was 95%, wherein 99% of the produced 4-acetyl-1,2-dimethylcyclohexene was present in the upper phase and 1% of the produced 4-acetyl-1,2-dimethylcyclohexene was present in the lower phase. Subsequently, the amounts of ytterbium tris(bis(perfluorooctanesulfonyl)imide) present in the upper phase and the lower phase were individually measured in terms of the amounts of ytterbium by atomic emission spectrometry. It was found that not less than 99% of the Lewis acid catalyst was present in the lower phase.

It was confirmed that when the reaction is performed using the Lewis acid catalyst composition of the present invention, the product and the catalyst are dissolved in the upper phase (dichloromethane and perfluorobenzene) and the lower phase (perfluorohexane and perfluorobenzene), respectively, so that separation therebetween can be performed easily.

EXAMPLE 19

224 μl of 2,3-dimethylbutadiene and 248 μl of methyl vinyl ketone were added to a mixed medium of 2 ml of perfluorohexane, 4 ml of dichloromethane and 2 ml of perfluorobenzene. To the resultant mixture was added 3 mol % of ytterbium tris(bis(perfluorooctanesulfonyl)imide) (as a Lewis acid catalyst), based on the molar amount of the 2,3-dimethylbutadiene, thereby obtaining a Lewis acid catalyst composition containing the 2,3-dimethylbutadiene and the methyl vinyl ketone. The obtained Lewis acid catalyst composition containing the 2,3-dimethylbutadiene and the methyl vinyl ketone was stirred to thereby effect a reaction between the 2,3-dimethylbutadiene and the methyl vinyl ketone at 37° C. for 1 hour. The reaction system became homogeneous during the reaction. The resultant reaction mixture was allowed to stand still at room temperature, so that the reaction mixture separated into two phases (an upper phase and a lower phase). Each of the upper phase and the lower phase was individually analyzed by gas chromatography. It was found that the overall yield of the reaction product (i.e., 4-acetyl-1,2-dimethylcyclohexene) in the upper and lower phases was 95%, wherein 99% of the produced 4-acetyl-1,2-dimethylcyclohexene was present in the upper phase and 1% of the produced 4-acetyl-1,2-dimethylcyclohexene was present in the lower phase. Subsequently, the amounts of ytterbium tris(bis(perfluorooctanesulfonyl)imide) present in the upper phase and the lower phase were individually measured in terms of the amounts of ytterbium by atomic emission spectrometry. It was found that not less than 99% of the Lewis acid catalyst was present in the lower phase.

It was confirmed that when the reaction is performed using the Lewis acid catalyst composition of the present invention, the product and the catalyst are separately dissolved in the upper phase (dichloromethane and perfluorobenzene) and the lower phase (perfluorohexane and perfluorobenzene), respectively, so that separation therebetween can be performed easily.

EXAMPLE 20

224 μl of 2,3-dimethylbutadiene and 248 μl of methyl vinyl ketone were added to a mixed medium of 2 ml of perfluorohexane, 4 ml of dichloromethane and 2 ml of perfluorobenzene. To the resultant mixture was added 2 mol % of scandium tris(bis(perfluorooctanesulfonyl)imide) (as a Lewis acid catalyst), based on the molar amount of the 2,3-dimethylbutadiene, thereby obtaining a Lewis acid catalyst composition containing the 2,3-dimethylbutadiene and the methyl vinyl ketone. The obtained Lewis acid catalyst composition containing the 2,3-dimethylbutadiene and the methyl vinyl ketone was stirred to thereby effect a reaction between the 2,3-dimethylbutadiene and the methyl vinyl ketone at 37° C. for 1 hour. The reaction system became homogeneous during the reaction. The resultant reaction mixture was allowed to stand still at room temperature, so that the reaction mixture separated into two phases (an upper phase and a lower phase). Each of the upper phase and the lower phase was individually analyzed by gas chromatography. It was found that the overall yield of the reaction product, (i.e., 4-acetyl-1,2-dimethylcyclohexene) in the upper and lower phases was 96%, wherein 99% of the produced 4-acetyl-1,2-dimethylcyclohexene was present in the upper phase and 1% of the produced 4-acetyl-1,2-dimethylcyclohexene was present in the lower phase. Subsequently, the amounts of scandium tris(bis(perfluorooctanesulfonyl)imide) present in the upper phase and the lower phase were individually measured in terms of the amounts of scandium by atomic emission spectrometry. It was found that not less than 99% of the Lewis acid catalyst was present in the lower phase.

It was confirmed that when the reaction is performed using the Lewis acid catalyst composition of the present invention, the product and the catalyst are separately dissolved in the upper phase (dichloromethane and perfluorobenzene) and the lower phase (perfluorohexane and perfluorobenzene), respectively, so that separation therebetween can be performed easily.

EXAMPLE 21

224 μl of 2,3-dimethylbutadiene and 248 μl of methyl vinyl ketone were added to a mixed medium of 2 ml of perfluorohexane, 4 ml of dichloromethane and 2 ml of perfluorobenzene. To the resultant mixture was added 4 mol % of lanthanum tris(bis(perfluorooctanesulfonyl)imide) (as a Lewis acid catalyst), based on the molar amount of the 2,3-dimethylbutadiene, thereby obtaining a Lewis acid catalyst composition containing the 2,3-dimethylbutadiene and the methyl vinyl ketone. The obtained Lewis acid catalyst composition containing the 2,3-dimethylbutadiene and the methyl vinyl ketone was stirred to thereby effect a reaction between the 2,3-dimethylbutadiene and the methyl vinyl ketone at 37° C. for 1 hour. The reaction system became homogeneous during the reaction. The resultant reaction mixture was allowed to stand still at room temperature, so that the reaction mixture separated into two phases (an upper phase and a lower phase). Each of the upper phase and the lower phase was individually analyzed by gas chromatography. It was found that the overall yield of the reaction product (i.e., 4-acetyl-1,2-dimethylcyclohexene) in the upper and lower phases was 94%, wherein 99% of the produced 4-acetyl-1,2-dimethylcyclohexene was present in the upper phase and 1% of the produced 4-acetyl-1,2-dimethylcyclohexene was present in the lower phase. Subsequently, the amounts of lanthanum tris(bis(perfluorooctanesulfonyl)imide) in the upper phase and the lower phase were individually measured in terms of the amounts of lanthanum by atomic emission spectrometry. It was found that not less than 99% of the Lewis acid catalyst was present in the lower phase.

It was confirmed that when the reaction is performed using the Lewis acid catalyst composition of the present invention, the product and the catalyst are separately dissolved in the upper phase (dichloromethane and perfluorobenzene) and the lower phase (perfluorohexane and perfluorobenzene), respectively, so that separation therebetween can be performed easily.

EXAMPLE 22

216 mg of benzaldehyde and 480 mg of methyl trimethylsilyl dimethylketene acetal were added to a mixed medium of 2 ml of perfluorohexane, 4 ml of dichloromethane and 2 ml of perfluorobenzene. To the resultant mixture was added 0.5 mol % of ytterbium tris(bis(perfluorooctanesulfonyl)imide) (as a Lewis acid catalyst), based on the molar amount of the benzaldehyde, thereby obtaining a Lewis acid catalyst composition containing the benzaldehyde and the methyl trimethylsilyl dimethylketene acetal. The obtained Lewis acid catalyst composition containing the benzaldehyde and the methyl trimethylsilyl dimethylketene acetal was stirred to thereby effect a reaction between the benzaldehyde and the methyl trimethylsilyl dimethylketene acetal at 37° C. for 10 minutes. The reaction system became homogeneous during the reaction. The resultant reaction mixture was allowed to stand still at room temperature, so that the reaction mixture separated into two phases (an upper phase and a lower phase). Each of the upper phase and the lower phase was individually analyzed by gas chromatography. It was found that the overall yield of the reaction product (i.e., methyl 3-trimethylsilyloxy-2,2-dimethyl-3-phenylpropionate) in the upper and lower phases was 86%, wherein 99% of the produced methyl 3-trimethylsilyloxy-2,2-dimethyl-3-phenylpropionate was present in the upper phase and 1% of the produced methyl 3-trimethylsilyloxy-2,2-dimethyl-3-phenylpropionate was present in the lower phase. Subsequently, the amounts of ytterbium tris(bis(perfluorooctanesulfonyl)imide) present in the upper phase and the lower phase were individually measured in terms of the amounts of ytterbium by atomic emission spectrometry. It was found that 98% of the Lewis acid catalyst was present in the lower phase.

It was confirmed that when the reaction is performed using the Lewis acid catalyst composition of the present invention, the product and the catalyst are separately dissolved in the upper phase (dichloromethane and perfluorobenzene) and the lower phase (perfluorohexane and perfluorobenzene), respectively, so that separation therebetween can be performed easily.

EXAMPLE 23

216 mg of benzaldehyde and 480 mg of methyl trimethylsilyl dimethylketene acetal were added to a mixed medium of 2 ml of perfluorohexane, 4 ml of toluene and 2 ml of perfluorobenzene. To the resultant mixture was added 0.5 mol % of scandium tris(bis(perfluorooctanesulfonyl)imide) (as a Lewis acid catalyst), based on the molar amount of the benzaldehyde, thereby obtaining a Lewis acid catalyst composition containing the benzaldehyde and the methyl trimethylsilyl dimethylketene acetal. The obtained Lewis acid catalyst composition containing the benzaldehyde and the methyl trimethylsilyl dimethylketene acetal was stirred to thereby effect a reaction between the benzaldehyde and the methyl trimethylsilyl dimethylketene acetal at 39° C. for 10 minutes. The reaction system became homogeneous during the reaction. The resultant reaction mixture was allowed to stand still at room temperature, so that the reaction mixture separated into two phases (an upper phase and a lower phase). Each of the upper phase and the lower phase was individually analyzed by gas chromatography. It was found that the overall yield of the reaction product (i.e., methyl 3-trimethylsilyloxy-2,2-dimethyl-3-phenylpropionate) in the upper and lower phases was 85%, wherein 99% of the produced methyl 3-trimethylsilyloxy-2,2-dimethyl-3-phenylpropionate was present in the upper phase and 1% of the produced methyl 3-trimethylsilyloxy-2,2-dimethyl-3-phenylpropionate was present in the lower phase. Subsequently, the amounts of scandium tris(bis(perfluorooctanesulfonyl)imide) present in the upper phase and the lower phase were individually measured in terms of the amounts of scandium by atomic emission spectrometry. It was found that 99% of the Lewis acid catalyst was present in the lower phase.

It was confirmed that when the reaction is performed using the Lewis acid catalyst composition of the present invention, the product and the catalyst are separately dissolved in the upper phase (toluene and perfluorobenzene) and the lower phase (perfluorohexane and perfluorobenzene), respectively, so that separation therebetween can be performed easily.

EXAMPLE 24

216 mg of benzaldehyde and 480 mg of methyl trimethylsilyl dimethylketene acetal were added to a mixed medium of 2 ml of perfluorohexane, 4 ml of dichloromethane and 2 ml of perfluorotoluene. To the resultant mixture was added 1 mol % of lanthanum tris(bis(perfluorooctanesulfonyl)imide) (as a Lewis acid catalyst), based on the molar amount of the benzaldehyde, thereby obtaining a Lewis acid catalyst composition containing the benzaldehyde and the methyl trimethylsilyl dimethylketene acetal. The obtained Lewis acid catalyst composition containing the benzaldehyde and the methyl trimethylsilyl dimethylketene acetal was stirred to thereby effect a reaction between the benzaldehyde and the methyl trimethylsilyl dimethylketene acetal at 38° C. for 10 minutes. The reaction system became homogeneous during the reaction. The resultant reaction mixture was allowed to stand still at room temperature, so that the reaction mixture separated into two phases (an upper phase and a lower phase). Each of the upper phase and the lower phase was individually analyzed by gas chromatography. It was found that the overall yield of the reaction product (i.e., methyl 3-trimethylsilyloxy-2,2-dimethyl-3-phenylpropionate) in the upper and lower phases was 82%, wherein 99% of the produced methyl 3-trimethylsilyloxy-2,2-dimethyl-3-phenylpropionate was present in the upper phase and 1% of the produced methyl 3-trimethylsilyloxy-2,2-dimethyl-3-phenylpropionate was present in the lower phase. Subsequently, the amounts of lanthanum tris(bis(perfluorooctanesulfonyl)imide) present in the upper phase and the lower phase were individually measured in terms of the amounts of lanthanum by atomic emission spectrometry. It was found that 98% of the Lewis acid catalyst was present in the lower phase.

It was confirmed that when the reaction is performed using the Lewis acid catalyst composition of the present invention, the product and the catalyst are separately dissolved in the upper phase (dichloromethane and perfluorotoluene) and the lower phase (perfluorohexane and perfluorotoluene), respectively, so that separation therebetween can be performed easily.

EXAMPLE 25

216 mg of benzaldehyde and 480 mg of methyl trimethylsilyl dimethylketene acetal were added to a mixed medium of 3 ml of perfluorohexane, 2.5 ml of dichloromethane and 2 ml of perfluorobenzene. To the resultant mixture was added 3 mol % of yttrium tris(bis(perfluorooctanesulfonyl) imide) (as a Lewis acid catalyst), based on the molar amount of the benzaldehyde, thereby obtaining a Lewis acid catalyst composition containing the benzaldehyde and the methyl trimethylsilyl dimethylketene acetal. The obtained Lewis acid catalyst composition containing the benzaldehyde and the methyl trimethylsilyl dimethylketene acetal was stirred to thereby effect a reaction between the benzaldehyde and the methyl trimethylsilyl dimethylketene acetal at 38° C. for 10 minutes. The reaction system became homogeneous during the reaction. The resultant reaction mixture was allowed to stand still at room temperature, so that the reaction mixture separated into two phases (an upper phase and a lower phase). Each of the upper phase and the lower phase was individually analyzed by gas chromatography. It was found that the overall yield of the reaction product (i.e., methyl 3-trimethylsilyloxy-2,2-dimethyl-3-phenylpropionate) in the upper and lower phases was 79%, wherein 95% of the produced methyl 3-trimethylsilyloxy-2,2-dimethyl-3-phenylpropionate was present in the upper phase and 5% of the produced methyl 3-trimethylsilyloxy-2,2-dimethyl-3-phenylpropionate was present in the lower phase. Subsequently, the amounts of yttrium tris(bis(perfluorooctanesulfonyl)imide) present in the upper phase and the lower phase were individually measured in terms of the amounts of yttrium by atomic emission spectrometry. It was found that 99% of the Lewis acid catalyst was present in the lower phase.

It was confirmed that when the reaction is performed using the Lewis acid catalyst composition of the present invention, the product and the catalyst are separately dissolved in the upper phase (dichloromethane and perfluorobenzene) and the lower phase (perfluorohexane and perfluorobenzene), respectively, so that separation therebetween can be performed easily.

EXAMPLE 26

As a Lewis acid catalyst, ytterbium tris(tris(perfluorooctanesulfonyl)methide) was added to a mixed medium of 3 ml of perfluorohexane, 2.5 ml of dichloromethane and 2 ml of perfluorobenzene, thereby obtaining a Lewis acid catalyst composition. The amount of Lewis acid catalyst added was adjusted so that it would be 0.5 mol %, based on the molar amount of benzaldehyde to be added to the Lewis acid catalyst composition. To the obtained Lewis acid catalyst composition were added 216 mg of benzaldehyde and 480 mg of methyl trimethylsilyl dimethylketene acetal, followed by stirring to thereby effect a reaction between the benzaldehyde and the methyl trimethylsilyl dimethylketene acetal at 38° C. for 10 minutes. The reaction system became homogenous during the reaction. The resultant reaction mixture was allowed to stand still at room temperature, so that the reaction mixture separated into two phases (an upper phase and a lower phase). Each of the upper phase and the lower phase was individually analyzed by gas chromatography. It was found that the overall yield of the reaction product (i.e., methyl 3-trimethylsilyloxy-2,2-dimethyl-3-phenylpropionate) in the upper and lower phases was 86%, wherein 96% of the produced methyl 3-trimethylsilyloxy-2,2-dimethyl-3-phenylpropionate was present in the upper phase and 4% of the produced methyl 3-trimethylsilyloxy-2,2-dimethyl-3-phenylpropionate was present in the lower phase. Subsequently, the amounts of ytterbium tris(tris(perfluorooctanesulfonyl)methide) present in the upper phase and the lower phase were individually measured in terms of the amount of ytterbium by atomic emission spectrometry. It was found that 99% of the Lewis acid catalyst was present in the lower phase.

It was confirmed that when the reaction is performed using the Lewis acid catalyst composition of the present invention, the product and the catalyst are separately dissolved in the upper phase (dichloromethane and perfluorobenzene) and the lower phase (perfluorohexane and perfluorobenzene), respectively, so that separation therebetween can be performed easily.

EXAMPLE 27

216 mg of benzaldehyde and 480 mg of methyl trimethylsilyl dimethylketene acetal were added to a mixed medium of 3 ml of perfluorohexane, 2.5 ml of dichloromethane and 2 ml of perfluorobenzene. To the resultant mixture was added 0.5 mol % of ytterbium tris(tris(perfluorooctanesulfonyl)methide) (as a Lewis acid catalyst), based on the molar amount of the benzaldehyde, thereby obtaining a Lewis acid catalyst composition containing the benzaldehyde and the methyl trimethylsilyl dimethylketene acetal. The obtained Lewis acid catalyst composition containing the benzaldehyde and the methyl trimethylsilyl dimethylketene acetal was stirred to thereby effect a reaction between the benzaldehyde and the methyl trimethylsilyl dimethylketene acetal at 38° C. for 10 minutes. The reaction system became homogeneous during the reaction. The resultant reaction mixture was allowed to stand still at room temperature, so that the reaction mixture separated into two phases (an upper phase and a lower phase). Each of the upper phase and the lower phase was individually analyzed by gas chromatography. It was found that the overall yield of the reaction product (i.e., methyl 3-trimethylsilyloxy-2,2-dimethyl-3-phenylpropionate) in the upper and lower phases was 86%, wherein 96% of the produced methyl 3-trimethylsilyloxy-2,2-dimethyl-3-phenylpropionate was present in the upper phase and 4% of the produced methyl 3-trimethylsilyloxy-2,2-dimethyl-3-phenylpropionate was present in the lower phase. Subsequently, the amounts of ytterbium tris(tris(perfluorooctanesulfonyl)methide) present in the upper phase and the lower phase were individually measured in terms of the amounts of ytterbium by atomic emission spectrometry. It was found that 99% of the Lewis acid catalyst was present in the lower phase.

It was confirmed that when.the reaction is performed using the Lewis acid catalyst composition of the present invention, the product and the catalyst are separately dissolved in the upper phase (dichloromethane and perfluorobenzene) and the lower phase (perfluorohexane and perfluorobenzene), respectively, so that separation therebetween can be performed easily.

EXAMPLE 28

216 mg of benzaldehyde and 480 mg of methyl trimethylsilyl dimethylketene acetal were added to a mixed medium of 2 ml of perfluoromethylcyclohexane, 4 ml of dichloromethane and 2 ml of perfluorobenzene. To the resultant mixture was added 5 mol % of ytterbium tris (perfluorooctanesulfonate) (as a Lewis acid catalyst), based on the molar amount of the benzaldehyde, thereby obtaining a Lewis acid catalyst composition containing the benzaldehyde and the methyl trimethylsilyl dimethylketene acetal. The obtained Lewis acid catalyst composition containing the benzaldehyde and the methyl trimethylsilyl dimethylketene acetal was stirred to thereby effect a reaction between the benzaldehyde and the methyl trimethylsilyl dimethylketene acetal at room temperature for 4 hours. The resultant reaction mixture was allowed to stand still at room temperature, so that the reaction mixture separated into two phases (an upper phase and a lower phase). Each of the upper phase and the lower phase was individually analyzed by gas chromatography. It was found that the overall yield of the reaction product (i.e., methyl 3-trimethylsilyloxy-2,2-dimethyl-3-phenylpropionate) in the upper and lower phases was 70%, wherein 99% of the produced methyl 3-trimethylsilyloxy-2,2-dimethyl-3-phenylpropionate was present in the upper phase and 1% of the produced methyl 3-trimethylsilyloxy-2,2-dimethyl-3-phenylpropionate was present in the lower phase. Subsequently, the amounts of ytterbium tris (perfluorooctanesulfonate) present in the upper phase and the lower phase were individually measured in terms of the amounts of ytterbium by atomic emission spectrometry. It was found that 99% of the Lewis acid catalyst was present in the lower phase.

It was confirmed that when the reaction is performed using the Lewis acid catalyst composition of the present invention, the product and the catalyst are separately dissolved in the upper phase (dichloromethane and perfluorobenzene) and the lower phase (perfluoromethylcyclohexane and perfluorobenzene), respectively, so that separation therebetween can be performed easily.

EXAMPLE 29

224 µl of 2,3-dimethylbutadiene and 248 µl of methyl vinyl ketone were added to a mixed medium of 2 ml of perfluorohexane, 4 ml of dichloromethane and 2 ml of perfluorobenzene. To the resultant mixture was added 3 mol % of ytterbium tris(tris(perfluorooctanesulfonyl)methide) (as a Lewis acid catalyst), based on the molar amount of the 2,3-dimethylbutadiene, thereby obtaining a Lewis acid catalyst composition containing the 2,3-dimethylbutadiene and the methyl vinyl ketone. The obtained Lewis acid catalyst composition containing the 2,3-dimethylbutadiene and the methyl vinyl ketone was stirred to thereby effect a reaction between the 2,3-dimethylbutadiene and the methyl vinyl ketone at 37° C. for 1 hour. The reaction system became homogeneous during the reaction. The resultant reaction mixture was allowed to stand still at room temperature, so that the reaction mixture separated into two phases (an upper phase and a lower phase). Each of the upper phase and the lower phase was individually analyzed by gas chromatography. It was found that the overall yield of the reaction product (i.e., 4-acetyl-1,2-dimethylcyclohexene) in the upper and lower phases was 96%, wherein 98% of the produced 4-acetyl-1,2-dimethylcyclohexene was present in the upper phase and 2% of the produced 4-acetyl-1,2-dimethylcyclohexene was present in the lower phase. Subsequently, the amounts of ytterbium tris(tris (perfluorooctanesulfonyl)methide) present in the upper phase and the lower phase were individually measured in terms of the amounts of ytterbium by atomic emission spectrometry. It was found that not less than 99% of the Lewis acid catalyst was present in the lower phase.

It was confirmed that when the reaction is performed using the Lewis acid catalyst composition of the present invention, the product and the catalyst are separately dissolved in the upper phase (dichloromethane and perfluorobenzene) and the lower phase (perfluorohexane and perfluorobenzene), respectively, so that separation therebetween can be performed easily.

EXAMPLE 30

216 mg of benzaldehyde and 480 mg of methyl trimethylsilyl dimethylketene acetal were added to a mixed medium of 2 ml of perfluorohexane, 4 ml of dichloromethane and 2 ml of perfluorobenzene. To the resultant mixture was added 0.3 mol % of ytterbium tris(tris(perfluorooctanesulfonyl) methide) (as a Lewis acid catalyst), based on the molar amount of the benzaldehyde, thereby obtaining a Lewis acid catalyst composition containing the benzaldehyde and the methyl trimethylsilyl dimethylketene acetal. The Lewis acid catalyst composition containing the benzaldehyde and the methyl trimethylsilyl dimethylketene acetal was stirred to thereby effect a reaction between the benzaldehyde and the methyl trimethylsilyl dimethylketene acetal at 37° C. for 15 minutes. The reaction system became homogeneous during the reaction. The resultant reaction mixture was allowed to stand still at room temperature, so that the reaction mixture separated into two phases (an upper phase and a lower phase). Each of the upper phase and the lower phase was individually analyzed by gas chromatography. It was found that the overall yield of the reaction product (i.e., methyl 3-trimethylsilyloxy-2,2-dimethyl-3-phenylpropionate) in the upper and lower phases was 83%, wherein 99% of the produced methyl 3-trimethylsilyloxy-2,2-dimethyl-3-phenylpropionate was present in the upper phase and 1% of the produced methyl 3-trimethylsilyloxy-2,2-dimethyl-3-phenylpropionate was present in the lower phase. Subsequently, the amounts of ytterbium tris(tris (perfluorooctanesulfonyl)methide) present in the upper phase and the lower phase were individually measured by atomic emission spectrometry. It was found that 98% of the Lewis acid catalyst was present in the lower phase.

It was confirmed that when the reaction is performed using the Lewis acid catalyst composition of the present invention, the product and the catalyst are separately dissolved in the upper phase (dichloromethane and perfluorobenzene) and the lower phase (perfluorohexane and perfluorobenzene), respectively, so that separation therebetween can be performed easily.

EXAMPLE 31

216 mg of benzaldehyde and 480 mg of methyl trimethylsilyl dimethylketene acetal were added to a mixed medium of 2 ml of perfluoromethylcyclohexane, 4 ml of dichloromethane and 2 ml of perfluorobenzene. To the resultant mixture was added 0.5 mol % of ytterbium tris(tris (perfluorooctanesulfonyl)methide) (as a Lewis acid catalyst), based on the molar amount of the benzaldehyde, thereby obtaining a Lewis acid catalyst composition containing the benzaldehyde and the methyl trimethylsilyl dimethylketene acetal. The obtained Lewis acid catalyst composition containing the benzaldehyde and the methyl trimethylsilyl dimethylketene acetal was stirred to thereby effect a reaction between the benzaldehyde and the methyl trimethylsilyl dimethylketene acetal at 39° C. for 10 minutes. The reaction system became homogeneous during the reaction. The resultant reaction mixture was allowed to stand still at room temperature, so that the reaction mixture separated into two phases (an upper phase and a lower phase). Each of the upper phase and the lower phase was individually analyzed by gas chromatography. It was found that the overall yield of the reaction product (i.e., methyl 3-trimethylsilyloxy-2,2-dimethyl-3-phenylpropionate) in the upper and lower phases was 83%, wherein 99% of the produced methyl 3-trimethylsilyl-oxy-2,2-dimethyl-3-phenylpropionate was present in the upper phase and 1% of the produced methyl 3-trimethyl-silyloxy-2,2-dimethyl-3-phenylpropionate was present in the lower phase. Subsequently, the amounts of ytterbium tris(tris(perfluorooctanesulfonyl)methide) present in the upper phase and the lower phase were individually measured by atomic emission spectrometry. It was found that 99% of the Lewis acid catalyst was present in the lower phase.

It was confirmed that when the reaction is performed using the Lewis acid catalyst composition of the present invention, the product and the catalyst are separately dissolved in the upper phase (dichloromethane and perfluorobenzene) and the lower phase (perfluoromethylcyclohexane and perfluorobenzene), respectively, so that separation therebetween can be performed easily.

EXAMPLE 32

224 µl of 2,3-dimethylbutadiene and 248 µl of methyl vinyl ketone were added to a mixed medium of 2 ml of perfluoromethylcyclohexane, 3 ml of dichloroethane and 2 ml of perfluorobenzene. To the resultant mixture was 3 mol % of scandium tris(tris(perfluorooctanesulfonyl)methide) (as a Lewis acid catalyst), based on the molar amount of the 2,3-dimethylbutadiene, thereby obtaining a Lewis acid catalyst composition containing the 2,3-dimethylbutadiene and the methyl vinyl ketone. The obtained Lewis acid catalyst composition containing the 2,3-dimethylbutadiene and the methyl vinyl ketone was stirred to thereby effect a reaction between the 2,3-dimethylbutadiene and the methyl vinyl ketone at room temperature for 6 hours. The resultant reaction mixture was allowed to stand still at room temperature, so that the reaction mixture separated into two phases (an upper phase and a lower phase). Each of the upper phase and the lower phase was individually analyzed by gas chromatography. It was found that the overall yield of the reaction product (i.e., 4-acetyl-1,2-dimethylcyclohexene) in the upper and lower phases was 96%, wherein 99% of the produced 4-acetyl-1,2-dimethylcyclohexene was present in the upper phase and 1% of the produced 4-acetyl-1,2-dimethylcyclohexene was present in the lower phase. Subsequently, the amounts of scandium tris(tris(perfluorooctanesulfonyl)methide) in the upper phase and the lower phase were individually measured by atomic emission spectrometry. It was found that not less than 99% of the Lewis acid catalyst was present in the lower phase.

It was confirmed that when the reaction is performed using the Lewis acid catalyst composition of the present invention, the product and the catalyst are separately dissolved in the upper phase (dichloroethane and perfluorobenzene) and the lower phase (perfluoromethylcyclohexane and perfluorobenzene), respectively, so that separation therebetween can be performed easily.

EXAMPLE 33

224 µl of 2,3-dimethylbutadiene and 248 µl of methyl vinyl ketone were added to a mixed medium of 2 ml of perfluorohexane, 2 ml of chlorobenzene and 1 ml of perfluorobenzene. To the resultant mixture was added 4 mol % of scandium tris(tris(perfluorooctanesulfonyl)methide) (as a Lewis acid catalyst), based on the molar amount of the 2,3-dimethylbutadiene, thereby obtaining a Lewis acid catalyst composition containing the 2,3-dimethylbutadiene and the methyl vinyl ketone. The obtained Lewis acid catalyst composition containing the 2,3-dimethylbutadiene and the methyl vinyl ketone was stirred to thereby effect a reaction between the 2,3-dimethylbutadiene and the methyl vinyl ketone at room temperature for 7 hours. The resultant reaction mixture was allowed to stand still at room temperature, so that the reaction mixture separated into two phases (an upper phase and a lower phase). Each of the upper phase and the lower phase was individually analyzed by gas chromatography. It was found that the overall yield of the reaction product (i.e., 4-acetyl-1,2-dimethylcyclohexene) in the upper and lower phases was 90%, wherein 99% of the produced 4-acetyl-1,2-dimethylcyclohexene was present in the upper phase and 1% of the produced 4-acetyl-1,2-dimethylcyclohexene was present in the lower phase. Subsequently, the amounts of scandium tris(tris(perfluorooctanesulfonyl)methide) in the upper phase and the lower phase were individually measured by atomic emission spectrometry. It was found that not less than 99% of the Lewis acid catalyst was present in the lower phase.

It was confirmed that when the reaction is performed using the Lewis acid catalyst composition of the present invention, the product and the catalyst are separately dissolved in the upper phase (chlorobenzene and perfluorobenzene) and the lower phase (perfluorohexane and perfluorobenzene), respectively, so that separation therebetween can be performed easily.

EXAMPLE 34

150 mg of 2-adamantanone and 690 mg of 30% aqueous hydrogen peroxide were added to a mixed medium of 3 ml of perfluoromethylcyclohexane and 3 ml of dichloroethane. To the resultant mixture was added 3 mol % of scandium tris(tris(perfluorooctanesulfonyl)methide) (as a Lewis acid catalyst), based on the molar amount of the 2-adamantanone, thereby obtaining a Lewis acid catalyst composition containing the 2-adamantanone and the aqueous hydrogen peroxide. The obtained Lewis acid catalyst composition containing the 2-adamantanone and the aqueous hydrogen peroxide was stirred to thereby effect a reaction for producing a lactone (corresponding to the 2-adamantanone) by the Bayer-Villiger reaction at room temperature for 20 hours. The resultant reaction mixture was allowed to stand still, so that the reaction mixture separated into a dichloroethane phase, an aqueous phase and a perfluoromethylcyclohexane phase. The dichloroethane phase was analyzed by gas chromatography. It was found that the yield of the reaction product (i.e., the lactone) was 58%. Subsequently, the amounts of scandium tris(tris(perfluorooctanesulfonyl)methide) present in the three phases were individually measured by atomic emission spectrometry. It was found that not less than 99% of the Lewis acid catalyst was present in the perfluoromethylcyclohexane phase.

EXAMPLE 35

150 mg of 2-adamantanone and 2 g of 10% aqueous hydrogen peroxide were added to a mixed medium of 2 ml of perfluoromethylcyclohexane and 2 ml of dichloroethane. To the resultant mixture was added 3 mol % of scandium tris(tris(perfluorooctanesulfonyl)methide) (as a Lewis acid catalyst), based on the molar amount of the 2-adamantanone, thereby obtaining a Lewis acid catalyst composition containing the 2-adamantanone and the aqueous hydrogen peroxide. The obtained Lewis acid catalyst composition containing the 2-adamantanone and the aqueous hydrogen peroxide was stirred to thereby effect a reaction for producing a lactone (corresponding to the 2-adamantanone) by the Bayer-Villiger reaction at room temperature for 25 hours. The resultant reaction mixture was allowed to stand still, so that the reaction mixture separated into a dichloroethane phase, an aqueous phase and a perfluoromethylcyclohexane phase. The dichloroethane phase was analyzed by gas chromatography. It was found that the yield of the reaction product (i.e., the lactone) was 60%.

Subsequently, substantially the same reaction as mentioned above was repeated using the catalyst contained in the perfluoromethylcyclohexane phase. More specifically, the perfluoromethylcyclohexane phase containing scandium tris (tris(perfluorooctanesulfonyl)methide) was withdrawn from the reaction mixture, and then, thereto added were 150 mg of 2-adamantanone and 2 g of 10% aqueous hydrogen peroxide, further 2 ml of dichloroethane. The Bayer-Villiger reaction was performed in the same manner as mentioned above. The resultant reaction mixture was allowed to stand still, so that the reaction mixture separated into a dichloroethane phase, an aqueous phase and a perfluoromethylcyclohexane phase. The yield of the reaction product (i.e., the lactone) was 58%. Substantially the same procedure as mentioned above was repeated further thrice. The yields of the lactone in the thrice-repeated reactions were 60%, 61% and 59%, respectively.

From the above, it was confirmed that when the reaction is performed using the Lewis acid catalyst composition of the present invention, the product and the catalyst are separately dissolved in dichloroethane and perfluoromethylcyclohexane, respectively, so that not only separation between the product and the catalyst, but also recovery and recycling of the catalyst can be performed easily.

EXAMPLE 36

150 mg of 2-adamantanone and 690 mg of 30% aqueous hydrogen peroxide were added to a mixed medium of 2 ml of perfluoromethylcyclohexane, 4 ml of dichloromethane and 2 ml of perfluorobenzene. To the resultant mixture was added 3 mol % of scandium tris(bis (perfluorooctanesulfonyl)imide) (as a Lewis acid catalyst), based on the molar amount of the 2-adamantanone, thereby obtaining a Lewis acid catalyst composition containing the 2-adamantanone and the aqueous hydrogen peroxide. The obtained Lewis acid catalyst composition containing the 2-adamantanone and the aqueous hydrogen peroxide was stirred to effect a reaction for producing a lactone (corresponding to the 2-adamantanone) by the Bayer-Villiger reaction at room temperature for 15 hours. The resultant reaction mixture was allowed to stand still, so that the reaction mixture separated into a phase composed mainly of dichloromethane, an aqueous phase and a phase composed mainly of perfluoromethylcyclohexane. The phase composed mainly of dichloromethane was analyzed by gas chromatography. It was found that the yield of the reaction product (i.e., the lactone) was 61%.

Subsequently, substantially the same reaction as mentioned above was repeated using the catalyst contained in the perfluoromethylcyclohexane phase. More specifically, the phase composed mainly of perfluoromethylcyclohexane containing scandium tris(bis(perfluorooctanesulfonyl) imide) was withdrawn from the reaction mixture, and then, thereto added were 150 mg of 2-adamantanone and 690 mg of 30% aqueous hydrogen peroxide, further 4 ml of dichloromethane. The Bayer-Villiger reaction was performed in the same manner as mentioned above. The resultant reaction mixture was allowed to stand still, so that the reaction mixture separated into a phase composed mainly of dichloromethane, an aqueous phase and a phase composed mainly of perfluoromethylcyclohexane. The yield of the reaction product (i.e., the lactone) was 59%.

From the above, it was confirmed that when the reaction is performed using the Lewis acid catalyst composition of the present invention, the product and the catalyst are separately dissolved in dichloromethane and perfluoromethylcyclohexane, respectively, so that not only separation between the product and the catalyst, but also recovery and recycling of the catalyst can be performed easily.

EXAMPLE 37

112 $\mu$l of 2,3-dimethylbutadiene and 124 $\mu$l of methyl vinyl ketone were added to a mixed medium of 5 ml of perfluoromethylcyclohexane, 1 ml of perfluorobenzene and 3 ml of water. To the resultant mixture was added 7 mol % of scandium tris(tris(perfluorobutanesulfonyl)methide) (as a Lewis acid catalyst), based on the molar amount of the 2,3-dimethylbutadiene, thereby obtaining a Lewis acid catalyst composition containing the 2,3-dimethylbutadiene and the methyl vinyl ketone. The obtained Lewis acid catalyst composition containing the 2,3-dimethylbutadiene and the methyl vinyl ketone was stirred at room temperature so as to assume a suspension form, to thereby effect a reaction between the 2,3-dimethylbutadiene and the methyl vinyl ketone for 20 hours. The resultant reaction mixture was allowed to stand still, so that the reaction mixture separated into a product phase, an aqueous phase, and a homogeneous phase of perfluoromethylcyclohexane and perfluorobenzene. The homogeneous phase of perfluoromethylcyclohexane and perfluorobenzene was withdrawn from the reaction mixture, and then, 3 ml of dichloromethane was added to the remainder, thereby extract the reaction product (i.e., 4-acetyl-1,2-dimethylcyclohexene). The extract obtained was analyzed by gas chromatography. It was found that the yield of the reaction product was 70%.

Subsequently, using the catalyst-containing homogeneous phase of perfluoromethylcyclohexane and perfluorobenzene, production of 4-acetyl-1,2-dimethylcyclohexene was performed in substantially the same manner as mentioned above. The yield of the 4-acetyl -1,2-dimethylcyclohexene obtained was 68%.

EXAMPLE 38

112 $\mu$l of 2,3-dimethylbutadiene and 124 $\mu$l of methyl vinyl ketone were added to a mixed medium of 5 ml of perfluorohexane, 1 ml of perfluorobenzene and 3 ml of water. To the resultant mixture was added 10 mol % of ytterbium tris(tris(perfluorobutanesulfonyl)methide) (as a Lewis acid catalyst), based on the molar amount of the 2,3-dimethylbutadiene, thereby obtaining a Lewis acid catalyst composition containing the 2,3-dimethylbutadiene and the methyl vinyl ketone. The obtained Lewis acid catalyst composition containing the 2,3-dimethylbutadiene and the methyl vinyl ketone was stirred at room temperature so as to assume a suspension form, to thereby effect a reaction between the 2,3-dimethylbutadiene and the methyl vinyl ketone for 37 hours. The resultant reaction mixture was allowed to stand still, so that the reaction mixture separated into a product phase, an aqueous phase, and a homogeneous phase of perfluorohexane and perfluorobenzene. The homogeneous phase of perfluorohexane and perfluorobenzene was withdrawn from the reaction mixture, and then, 3 ml of dichloromethane was added to the remainder, to thereby extract the reaction product (i.e., 4-acetyl-1,2-dimethylcyclohexene). The extract obtained was analyzed by gas chromatography. It was found that the yield of the reaction product was 65%.

Subsequently, using the homogeneous phase of perfluorohexane and perfluorobenzene, production of 4-acetyl-1,2-dimethylcyclohexene was performed in substantially the same manner as mentioned above. The yield of the 4-acetyl-1,2-dimethylcyclohexene obtained was 64%.

EXAMPLE 39

112 µl of 2,3-dimethylbutadiene and 124 µl of methyl vinyl ketone were added to a mixed medium of 5 ml of perfluoromethylcyclohexane, 1 ml of perfluorobenzene and 4 ml of water. To the resultant mixture was added 15 mol % of yttrium tris(tris(perfluorooctanesulfonyl)methide) (as a Lewis acid catalyst), based on the molar amount of the 2,3-dimethylbutadiene, thereby obtaining a Lewis acid catalyst composition containing the 2,3-dimethylbutadiene and the methyl vinyl ketone. The obtained Lewis acid catalyst composition containing the 2,3-dimethylbutadiene and the methyl vinyl ketone was stirred at 35° C. so as to assume a suspension form, to thereby effect a reaction between the 2,3-dimethylbutadiene and the methyl vinyl ketone for 20 hours. The resultant reaction mixture was allowed to stand still, so that the reaction mixture separated into a product phase, an aqueous phase, and a homogeneous phase of perfluoromethylcyclohexane and perfluorobenzene. The homogeneous phase of perfluoromethylcyclohexane and perfluorobenzene was withdrawn from the reaction mixture, and then, 4 ml of dichloromethane was added to the remainder, to thereby extract the reaction product (i.e., 4-acetyl-1,2-dimethylcyclohexene). The extract obtained was analyzed by gas chromatography. It was found that the yield of the reaction product was 61%.

Subsequently, using the catalyst-containing homogeneous phase of perfluoromethylcyclohexane and perfluorobenzene, production of 4-acetyl-1,2-dimethylcyclohexene was performed in substantially the same manner as mentioned above. The yield of 4-acetyl-1,2-dimethylcyclohexene obtained was 59%.

EXAMPLE 40

216 mg of benzaldehyde and 480 mg of methyl trimethylsilyl dimethylketene acetal were added to a mixed medium of 6 ml of perfluoromethylcyclohexane, 1 ml of perfluorotoluene and 6 ml of water. To the resultant mixture was added 1.5 mol % of scandium tris(tris(perfluorooctanesulfonyl)methide) (as a Lewis acid catalyst), based on the molar amount of the benzaldehyde, thereby obtaining a Lewis acid catalyst composition containing the benzaldehyde and the methyl trimethylsilyl dimethylketene acetal. The obtained Lewis acid catalyst composition containing the benzaldehyde and the methyl trimethylsilyl dimethylketene acetal was stirred at room temperature so as to assume a suspension form, to thereby effect a reaction between the benzaldehyde and the methyl trimethylsilyl dimethylketene acetal for 3 hours. The resultant reaction mixture was allowed to stand still at room temperature, so that the reaction mixture separated into a product phase, an aqueous phase and a homogeneous phase of perfluoromethylcyclohexane and perfluorotoluene. The homogeneous phase of perfluoromethylcyclohexane and perfluorotoluene was withdrawn from the reaction mixture, and then, 6 ml of dichloromethane was added to the remainder, to thereby extract the reaction product (i.e., methyl 3-trimethylsilyloxy-2,2-dimethyl-3-phenylpropionate). The extract obtained was analyzed by gas chromatography. It was found that the yield of the reaction product was 58%.

Subsequently, using the catalyst-containing homogenous phase of perfluoromethylcyclohexane and perfluorotoluene, production of methyl 3-trimethylsilyloxy-2,2-dimethyl-3-phenylpropionate was performed in substantially the same manner as mentioned above. The yield of the methyl 3-trimethylsilyloxy-2,2-dimethyl-3-phenylpropionate obtained was 56%.

EXAMPLE 41

Synthesis of ytterbium tris(tris(perfluorobutanesulfonyl)methide)

3.0 g of tris(perfluorobutanesulfonyl)methide was added to an aqueous solution containing 15 ml of water and 15 ml of acetonitrile, and 0.39 g of ytterbium carbonate was added thereto while stirring, to effect a reaction therebetween in two steps. Illustratively stated, a reaction between the tris(perfluorobutanesulfonyl)methide and the ytterbium carbonate was first performed at 20° C. for 7 hours, and then, performed at 50° C. for 1 hour. The resultant reaction mixture was filtered to remove a precipitate contained therein, thereby obtaining a filtrate. The obtained filtrate was subjected to vacuum drying at 50° C. under a pressure of from 1 to 10 mmHg, followed by vacuum drying at 90° C. under a pressure of 0.01 mmHg for 24 hours, thereby obtaining 3.1 g of ytterbium tris(tris(perfluorobutanesulfonyl)methide) as a white solid.

The results of the elementary analysis of the obtained ytterbium tris(tris(perfluorobutanesulfonyl)methide) are shown below (theoretical values are shown in parentheses):

| Yb = 6.1 (6.3) % | C = 16.8 (17.0) % |
|---|---|
| O = 10.6 (10.4) % | S = 10.2 (10.4) %. |

EXAMPLE 42

Synthesis of lanthanum tris(tris(perfluorobutanesulfonyl)methide)

3.0 g of tris(perfluorobutanesulfonyl)methide was added to an aqueous solution containing 10 ml of water and 10 ml of acetonitrile, and 0.32 g of lanthanum carbonate was added thereto while stirring, to effect a reaction therebetween in two steps. Illustratively stated, a reaction between the tris(perfluorobutanesulfonyl)methide and the lanthanum carbonate was first performed at 20° C. for 5 hours, and then, performed at 50° C. for 1 hour. The resultant reaction mixture was filtered to remove a precipitate contained therein, thereby obtaining a filtrate. The obtained filtrate was subjected to vacuum drying at 50° C. under a pressure of from 1 to 10 mmHg, followed by vacuum drying at 90° C. under a pressure of 0.01 mmHg for 24 hours, thereby obtaining 3.1 g of lanthanum tris(tris(perfluorobutanesulfonyl)methide) as a white solid.

The results of the elementary analysis of the obtained lanthanum tris(tris(perfluorobutanesulfonyl)methide) are shown below (theoretical values are shown in parentheses):

| La = 4.9 (5.1) % | C = 17.4 (17.2) % |
|---|---|
| O = 10.8 (10.6) % | S = 10.3 (10.6) %. |

EXAMPLE 43

Synthesis of scandium tris(tris(perfluorooctanesulfonyl)methide)

5.0 g of tris(perfluorooctanesulfonyl)methide was added to an aqueous solution containing 10 ml water and 10 ml acetonitrile, and 0.25 g of scandium acetate was added thereto while stirring, to effect a reaction therebetween in two steps. Illustratively stated, a reaction between the tris(perfluorooctanesulfonyl)methide and the scandium acetate was first performed at 20° C. for 5 hours, and then, performed at 50° C. for 1 hour. The resultant reaction mixture was filtered to remove any precipitate contained therein, thereby obtaining a filtrate. The obtained filtrate was subjected to vacuum drying at 50° C. under a pressure of from 1 to 10 mmHg, followed by vacuum drying at 90° C. under a pressure of 0.01 mmHg for 24 hours, thereby obtaining 4.7 g of scandium tris(tris(perfluorooctanesulfonyl)methide) as a white solid.

The results of the elementary analysis of the obtained scandium tris(tris(perfluorooctanesulfonyl)methide) are shown below (theoretical values are shown in parentheses):

| Sc = 0.9 (1.0) % | C = 20.5 (20.3) % |
|---|---|
| O = 6.7 (6.5) % | S = 6.3 (6.5) %. |

EXAMPLE 44

Synthesis of yttrium tris(tris(perfluorobutanesulfonyl)methide)

3.0 g of tris(perfluorobutanesulfonyl)methide was added to an aqueous solution containing 10 ml of water and 5 ml of acetonitrile, and 0.27 g of yttrium carbonate was added thereto while stirring, to effect a reaction therebetween in two steps. Illustratively stated, a reaction between the tris(perfluorobutanesulfonyl)methide and the yttrium carbonate was first performed at 20° C. for 5 hours, and then, performed at 50° C. for 1 hour. The resultant reaction mixture was filtered to remove a precipitate contained therein, thereby obtaining a filtrate. The obtained filtrate was subjected to vacuum drying at 50° C. under a pressure of from 1 to 10 mmHg, followed by vacuum drying at 90° C. under a pressure of 0.01 mmHg for 24 hours, thereby obtaining 2.9 g of yttrium tris(tris(perfluorobutanesulfonyl)methide) as a white solid.

The results of the elementary analysis of the obtained yttrium tris(tris(perfluorobutanesulfonyl)methide) are shown below (theoretical values are shown in parentheses):

| Y = 3.3 (3.3) % | C = 17.4 (17.5) % |
|---|---|
| O = 10.6 (10.8) % | S = 10.9 (10.8) %. |

EXAMPLE 45

To 10 ml of acetonitrile were added 560 $\mu$l of 2,3-dimethylbutadiene and 620 $\mu$l of methyl vinyl ketone, and then, ytterbium tris(tris(perfluorobutanesulfonyl)methide) (as a Lewis acid catalyst) as prepared in Example 41 was added thereto. The amount of Lewis acid catalyst added was 5 mol %, based on the molar amount of the 2,3-dimethylbutadiene. The reaction between the 2,3-dimethylbutadiene and the methyl vinyl ketone was performed at room temperature for 15 hours while stirring. The resultant reaction mixture was analyzed by gas chromatography, and as shown in Table 1, the yield of the reaction product (i.e., 4-acetyl-1,2-dimethylcyclohexene) was 86%.

EXAMPLES 46 TO 48

The reaction between 2,3-dimethylbutadiene and methyl vinyl ketone was performed in substantially the same manner as in Example 45, except that each of the compounds synthesized in Examples 42 to 44 was individually used as the Lewis acid catalyst. The yields of the reaction product (i.e., 4-acetyl-1,2-dimethylcyclohexene) are shown in Table 1.

Comparative Example 1

The reaction between 2,3-dimethylbutadiene and methyl vinyl ketone was performed in substantially the same manner as in Example 45, except that no catalyst was used. The yield of the reaction product (i.e., 4-acetyl-1,2-dimethylcyclohexene) is shown in Table 1.

TABLE 1

| | Catalyst | Reaction Yield (%) |
|---|---|---|
| Example 45 | $((C_4F_9SO_2)_3C)_3Yb$ | 86 |
| Example 46 | $((C_4F_9SO_2)_3C)_3La$ | 84 |
| Example 47 | $((C_8F_{17}SO_2)_3C)_3Sc$ | 89 |
| Example 48 | $((C_4F_9SO_2)_3C)_3Y$ | 82 |
| Comparative Example 1 | None | 0.6 |

EXAMPLE 49

To 5 ml of acetonitrile were added 3.0 g of anisole and 5.6 g of acetic anhydride, and then, ytterbium tris(tris(perfluorobutanesulfonyl )methide) (as a Lewis acid catalyst) as prepared in Example 41 was added thereto. The amount of Lewis acid catalyst added was 5 mol %, based on the molar amount of the anisole. The reaction between the anisole and the acetic anhydride was performed at 50° C. for 3 hours while stirring. The resultant reaction mixture was analyzed by gas chromatography, and as shown in Table 2, the yield of the reaction product (i.e., p-methoxyacetophenone) was 80%.

EXAMPLES 50 AND 51

The reaction between anisole and acetic anhydride was performed in substantially the same manner as in Example 49, except that each of the compounds as synthesized in Examples 42 and 43 was individually used as the Lewis acid catalyst. The yields of the reaction product (i.e., p-methoxyacetophenone) are shown in Table 2.

Comparative Examples 2 and 3

The reaction between anisole and acetic anhydride was performed in substantially the same manner as in Example 49, except that no catalyst was used in Comparative Example 2 and that $AlCl_3$ was used as the Lewis acid catalyst in Comparative Example 3. The yields of the reaction product (i.e., p-methoxyacetophenone) are shown in Table 2.

TABLE 2

| | Catalyst | Reaction Yield (%) |
|---|---|---|
| Example 49 | $((C_4F_9SO_2)_3C)_3Yb$ | 80 |
| Example 50 | $((C_4F_9SO_2)_3C)_3La$ | 83 |
| Example 51 | $((C_8F_{17}SO_2)_3C)_3Sc$ | 78 |
| Comparative Example 2 | None | 0.1 |
| Comparative Example 3 | $AlCl_3$ | 4 |

INDUSTRIAL APPLICABILITY

The Lewis acid catalyst composition of the present invention can be employed in various acid catalytic reactions in which a Lewis acid is used as a catalyst. By the use of the Lewis acid catalyst composition of the present invention for a reaction using, as a raw material or raw materials, a nucleophilic reagent or nucleophilic reagents, not only can the Lewis acid catalyst be easily separated and recovered from the resultant reaction mixture, but also the catalyst can be recycled without suffering a lowering of the catalytic activity of the Lewis acid. The Lewis acid catalyst used in the present invention is stable to water and has high catalytic activity, as compared to other known Lewis acid catalyst. Therefore, the Lewis acid catalyst used in the Lewis acid catalyst composition of the present invention can be advantageously used for acid catalytic reactions without suffering a lowering of the catalytic activity even when the catalyst is repeatedly used. The Lewis acid catalyst composition of the present invention can be employed in reactions, such as the Friedel-Crafts reaction, the Diels-Alder reaction, a dehydration reaction of an alcohol, an aldol reaction, a synthesis reaction of a Schiff base, the Meerwein-Ponndorf-Verley reduction reaction, the Michael reaction, the Mannich reaction, an esterification reaction, a transesterification reaction, the Fries rearrangement reaction, an O-glycosidation reaction, a polymerization reaction of an olefin, an oxidation reaction with hydrogen peroxide or an organic peroxide and a methylolation reaction of a benzene nucleus.

What is claimed is:

1. A Lewis acid catalyst composition comprising (I) a mixed medium and (II) a Lewis acid catalyst, said mixed medium (I) comprising (A) a perfluorinated aliphatic hydrocarbon or alicyclic hydrocarbon, and (B) at least one non-fluorinated hydrocarbon selected from the group consisting of an aliphatic hydrocarbon or alicyclic hydrocarbon; a halogenated aliphatic hydrocarbon, exclusive of a fluorinated aliphatic hydrocarbon or alicyclic hydrocarbon; an aromatic hydrocarbon; and a halogenated aromatic hydrocarbon, exclusive of a fluorinated aromatic hydrocarbon, said Lewis acid catalyst (II) being at least one compound selected from the group consisting of compounds respectively represented by the following formulae (1), (2) and (3):

$$(R_fSO_3)_nM \qquad (1),$$

$$[(R_fSO_2)_2N]_nM \qquad (2),$$

and $$[(R_fSO_2)_3C]_nM \qquad (3)$$

wherein $R_f$ represents a perfluoroalkyl group having 2 or more carbon atoms, M represents a rare earth element, and n represents an integer equivalent to the valence of M.

2. The Lewis acid catalyst composition according to claim 1, wherein said mixed medium (I) further comprises (C) a perfluorinated aromatic hydrocarbon.

3. The Lewis acid catalyst composition according to claim 2, wherein the ratio of the total volume of said perfluorinated aliphatic hydrocarbon or alicyclic hydrocarbon (A) and said non-fluorinated hydrocarbon (B) to the volume of said perfluorinated aromatic hydrocarbon (C) is 1.5 or more.

4. The Lewis acid catalyst composition according to claim 1 or 2, which further comprises (III) at least one nucleophilic reagent.

5. A Lewis acid catalyst composition comprising (I') a mixed medium and (II) a Lewis acid catalyst, said mixed medium (I') comprising (A) a perfluorinated aliphatic hydrocarbon or alicyclic hydrocarbon, (C) a perfluorinated aromatic hydrocarbon, and (D) water, and said Lewis acid catalyst (II) being at least one compound selected from the group consisting of compounds respectively represented by the following formulae (1), (2) and (3):

$$(R_fSO_3)_nM \qquad (1),$$

$$[(R_fSO_2)_2N]_nM \qquad (2),$$

and $$[(R_fSO_2)_3C]_nM \qquad (3)$$

wherein $R_f$ represents a perfluoroalkyl group having 2 or more carbon atoms, M represents a rare earth element, and n represents an integer equivalent to the valence of M.

6. The Lewis acid composition according to claim 5, which further comprises (III) at least one nucleophilic reagent.

7. A Lewis acid catalyst represented by the following formula (3):

$$[(R_fSO_2)_3C]_nM \qquad (3)$$

wherein $R_f$ represents a perfluoroalkyl group having 2 or more carbon atoms, M represents a rare earth element, and n represents an integer equivalent to the valence of M.

* * * * *